(12) United States Patent
Mackrell et al.

(10) Patent No.: US 11,693,548 B1
(45) Date of Patent: *Jul. 4, 2023

(54) USER INTERFACES AND SYSTEM INCLUDING SAME

(71) Applicant: The PNC Financial Services Group, Inc., Pittsburgh, PA (US)

(72) Inventors: Bryan L. Mackrell, Cranberry Township, PA (US); Michael Scott Ley, Moon Township, PA (US); Christine Johns, Allison Park, PA (US); David Wisely Vondle, Chicago, IL (US); Chui-Ling Michelle Moy, Chicago, IL (US); Jennifer Marie Levin, Chicago, IL (US); Marieke Smets, Chicago, IL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,039

(22) Filed: Jan. 11, 2021

Related U.S. Application Data

(63) Continuation of application No. 12/696,968, filed on Jan. 29, 2010, now Pat. No. 10,891,037.

(60) Provisional application No. 61/148,763, filed on Jan. 30, 2009.

(51) Int. Cl.
*G06F 3/04847* (2022.01)
(52) U.S. Cl.
CPC ................. *G06F 3/04847* (2013.01)
(58) Field of Classification Search
CPC .................................................. G06F 3/04847

USPC .......................................................... 705/39
See application file for complete search history.

(56) References Cited

U.S. PATENT DOCUMENTS

| | | |
|---|---|---|
| 4,367,402 A | 1/1983 | Giraud et al. |
| 4,443,027 A | 4/1984 | McNeely et al. |
| 4,648,037 A | 3/1987 | Valentino |
| 4,837,422 A | 6/1989 | Dethloff et al. |
| 5,101,200 A | 3/1992 | Swett |

(Continued)

FOREIGN PATENT DOCUMENTS

| | | |
|---|---|---|
| WO | 96/34358 A1 | 10/1996 |
| WO | 03/030054 A1 | 4/2003 |

OTHER PUBLICATIONS

U.S. Appl. No. 13/324,534, filed Dec. 13, 2011.

(Continued)

*Primary Examiner* — Cho Kwong
(74) *Attorney, Agent, or Firm* — Buchanan Ingersoll & Rooney PC

(57) ABSTRACT

An information graphic displayable via an electronic user interface to integrate information from accounts held at a financial institution. In one embodiment, the information graphic includes a first graphic element to display first information associated with at least one first account and a second graphic element to display second information associated with at least one second account. A dimension of the first graphic element is representative of the first information and a dimension of the second graphic element is representative of the second information. A first portion of the second graphic element is selectable to alternately virtually hide and display a second portion of the second graphic element.

40 Claims, 22 Drawing Sheets

(56) References Cited

U.S. PATENT DOCUMENTS

| | | |
|---|---|---|
| 5,500,513 A | 3/1996 | Langhans et al. |
| 5,621,640 A | 4/1997 | Burke |
| 5,649,118 A | 7/1997 | Carlisle et al. |
| 5,845,260 A | 12/1998 | Nakano et al. |
| 5,918,217 A | 6/1999 | Maggioncalda et al. |
| 5,953,710 A | 9/1999 | Fleming |
| 5,963,925 A | 10/1999 | Kolling et al. |
| 5,991,749 A | 11/1999 | Morrill, Jr. |
| 6,012,044 A | 1/2000 | Maggioncalda et al. |
| 6,032,134 A | 2/2000 | Weissman |
| 6,044,360 A | 3/2000 | Picciallo |
| 6,049,776 A | 4/2000 | Donnelly et al. |
| 6,052,675 A | 4/2000 | Checchio |
| 6,064,984 A | 5/2000 | Ferguson et al. |
| 6,064,986 A | 5/2000 | Edelman |
| 6,085,174 A | 7/2000 | Edelman |
| 6,088,682 A | 7/2000 | Burke |
| 6,112,191 A | 8/2000 | Burke |
| 6,128,603 A | 10/2000 | Dent et al. |
| 6,173,269 B1 | 1/2001 | Solokl et al. |
| 6,332,154 B2 | 12/2001 | Beck et al. |
| 6,353,811 B1 | 3/2002 | Weissman |
| 6,401,079 B1 | 6/2002 | Kahn et al. |
| 6,411,938 B1 | 6/2002 | Gates et al. |
| 6,473,794 B1 | 10/2002 | Guheen et al. |
| 6,493,685 B1 | 12/2002 | Ensel et al. |
| 6,519,571 B1 | 2/2003 | Guheen et al. |
| 6,601,233 B1 | 7/2003 | Underwood |
| 6,609,110 B1 | 8/2003 | Dowd et al. |
| 6,633,878 B1 | 10/2003 | Underwood |
| 6,636,242 B2 | 10/2003 | Bowman-Amuah |
| 6,636,833 B1 | 10/2003 | Flitcroft et al. |
| 6,684,190 B1 | 1/2004 | Powers et al. |
| 6,718,314 B2 | 4/2004 | Chaum et al. |
| 6,718,535 B1 | 4/2004 | Underwood |
| 6,742,002 B2 | 5/2004 | Arrowood |
| 6,742,704 B2 | 6/2004 | Fitzmaurice et al. |
| 6,839,687 B1 | 1/2005 | Dent et al. |
| 6,839,692 B2 | 1/2005 | Carrott et al. |
| 6,876,971 B1 | 4/2005 | Burke |
| 6,921,268 B2 | 7/2005 | Bruno et al. |
| 6,993,510 B2 | 1/2006 | Guy et al. |
| 7,024,390 B1 | 4/2006 | Mori et al. |
| 7,031,939 B1 | 4/2006 | Gallagher et al. |
| 7,039,440 B2 | 5/2006 | Rodriguez et al. |
| 7,062,458 B2 | 6/2006 | Maggioncalda et al. |
| 7,076,465 B1 | 7/2006 | Blagg et al. |
| 7,100,195 B1 | 8/2006 | Underwood |
| 7,110,979 B2 | 9/2006 | Tree |
| 7,143,064 B2 | 11/2006 | Picciallo et al. |
| 7,146,338 B2 | 12/2006 | Kight et al. |
| 7,147,149 B2 | 12/2006 | Giraldin et al. |
| 7,165,041 B1 | 1/2007 | Guheen et al. |
| 7,171,370 B1 | 1/2007 | Burke |
| 7,175,073 B2 | 2/2007 | Kelley et al. |
| 7,184,979 B1 | 2/2007 | Carson |
| 7,248,855 B2 | 7/2007 | Joyce et al. |
| 7,249,092 B2 | 7/2007 | Dunn et al. |
| 7,249,097 B2 | 7/2007 | Hutchison et al. |
| 7,263,507 B1 | 8/2007 | Brake, Jr. et al. |
| 7,264,153 B1 | 9/2007 | Burke |
| 7,319,986 B2 | 1/2008 | Praisner et al. |
| 7,328,839 B2 | 2/2008 | Keohane et al. |
| 7,337,947 B1 | 3/2008 | Swanson, Sr. |
| 7,346,528 B2 | 3/2008 | Thengvall et al. |
| 7,376,569 B2 | 5/2008 | Plunkett et al. |
| 7,379,887 B2 | 5/2008 | Pachon et al. |
| 7,382,773 B2 | 6/2008 | Schoeneberger et al. |
| 7,401,731 B1 | 7/2008 | Pietz et al. |
| 7,502,758 B2 | 3/2009 | Burke |
| 7,536,351 B2 | 5/2009 | Leblanq et al. |
| 7,571,849 B2 | 8/2009 | Burke |
| 7,577,665 B2 | 8/2009 | Ramer et al. |
| 7,580,881 B2 | 8/2009 | Singer et al. |
| 7,620,573 B2 | 11/2009 | Jameson |
| 7,627,512 B2 | 12/2009 | Harris et al. |
| 7,647,322 B2 | 1/2010 | Thomsen |
| 7,660,581 B2 | 2/2010 | Ramer et al. |
| 7,668,768 B2 | 2/2010 | Oikonomidis |
| 7,672,861 B2 | 3/2010 | Al-Otaibi et al. |
| 7,685,083 B2 | 3/2010 | Fairweather |
| 7,707,052 B2 | 4/2010 | Kuhn et al. |
| 7,711,619 B2 | 5/2010 | Merton et al. |
| 7,716,217 B2 | 5/2010 | Marston et al. |
| 7,729,959 B1 | 6/2010 | Wells et al. |
| 7,752,123 B2 | 7/2010 | Brookfield et al. |
| 7,774,257 B2 | 8/2010 | Maggioncalda et al. |
| 7,783,564 B2 | 8/2010 | Mullen et al. |
| 7,788,146 B2 | 8/2010 | McCarthy, Jr. |
| 7,792,748 B1 | 9/2010 | Ebersole et al. |
| 7,797,181 B2 | 9/2010 | Vianello |
| 7,797,218 B2 | 9/2010 | Rosen et al. |
| 7,797,226 B2 | 9/2010 | Ram et al. |
| 7,801,814 B2 | 9/2010 | Cataline et al. |
| 7,809,641 B2 | 10/2010 | Sanders et al. |
| 7,818,233 B1 | 10/2010 | Sloan et al. |
| 7,827,102 B2 | 11/2010 | Saliba et al. |
| 7,831,494 B2 | 11/2010 | Sloan et al. |
| 7,835,972 B2 | 11/2010 | Almeida et al. |
| 7,844,492 B2 | 11/2010 | Perkowski et al. |
| 7,844,546 B2 | 11/2010 | Fleishman |
| 7,848,948 B2 | 12/2010 | Perkowski et al. |
| 7,860,871 B2 | 12/2010 | Ramer et al. |
| 7,865,187 B2 | 1/2011 | Ramer et al. |
| 7,870,066 B2 | 1/2011 | Lin |
| 7,912,790 B2 | 3/2011 | Albertsson |
| 7,937,292 B2 | 5/2011 | Baig et al. |
| 7,962,419 B2 | 6/2011 | Gupta et al. |
| 8,015,090 B1 | 9/2011 | Borzych et al. |
| 8,086,558 B2 | 12/2011 | Dewar |
| 8,099,350 B2 | 1/2012 | Ryder |
| 2001/0047310 A1 | 11/2001 | Russell |
| 2002/0002479 A1 | 1/2002 | Almog et al. |
| 2002/0007330 A1* | 1/2002 | Kumar ............... G06F 9/547 705/40 |
| 2002/0026412 A1 | 2/2002 | Kabin |
| 2002/0046074 A1 | 4/2002 | Barton |
| 2002/0052773 A1 | 5/2002 | Kraemer et al. |
| 2002/0055870 A1 | 5/2002 | Thomas |
| 2002/0077955 A1 | 6/2002 | Ramm |
| 2002/0095363 A1 | 7/2002 | Sloan et al. |
| 2002/0099635 A1 | 7/2002 | Guiragosian |
| 2002/0103805 A1 | 8/2002 | Canner et al. |
| 2002/0120568 A1 | 8/2002 | Leblang et al. |
| 2002/0123949 A1 | 9/2002 | VanLeeuwen |
| 2002/0133368 A1 | 9/2002 | Strutt et al. |
| 2002/0147672 A1 | 10/2002 | Gaini |
| 2002/0152158 A1 | 10/2002 | Paleiov et al. |
| 2002/0188536 A1 | 12/2002 | Molosavljevic et al. |
| 2003/0009411 A1 | 1/2003 | Ram et al. |
| 2003/0033226 A1 | 2/2003 | Anderson |
| 2003/0050889 A1 | 3/2003 | Burke |
| 2003/0055758 A1 | 3/2003 | Sidhu et al. |
| 2003/0083930 A1 | 5/2003 | Burke |
| 2003/0135634 A1 | 7/2003 | Moeller et al. |
| 2003/0177027 A1 | 9/2003 | Dimarco |
| 2003/0216957 A1 | 11/2003 | Florence et al. |
| 2003/0221118 A1 | 11/2003 | Walker |
| 2004/0012588 A1 | 1/2004 | Lulls |
| 2004/0019543 A1 | 1/2004 | Blaqg et al. |
| 2004/0044632 A1 | 3/2004 | Onn et al. |
| 2004/0054610 A1 | 3/2004 | Amstutz et al. |
| 2004/0068432 A1 | 4/2004 | Meyerkopf et al. |
| 2004/0088177 A1 | 5/2004 | Travis et al. |
| 2004/0107112 A1 | 6/2004 | Cotter |
| 2004/0117202 A1 | 6/2004 | Winklevoss et al. |
| 2004/0148234 A1 | 7/2004 | Gonen-Friedman et al. |
| 2004/0158513 A1 | 8/2004 | Musacchio |
| 2004/0186852 A1 | 9/2004 | Rosen |
| 2004/0192351 A1 | 9/2004 | Duncan |
| 2004/0215560 A1 | 10/2004 | Amalraj et al. |
| 2004/0254805 A1 | 12/2004 | Schwerin-Wenzel et al. |
| 2004/0267559 A1 | 12/2004 | Hinderer et al. |
| 2005/0026119 A1 | 2/2005 | Ellis et al. |

(56) References Cited

U.S. PATENT DOCUMENTS

| | | |
|---|---|---|
| 2005/0027632 A1 | 2/2005 | Zeitoun et al. |
| 2005/0060228 A1 | 3/2005 | Woo |
| 2005/0060318 A1 | 3/2005 | Brickman |
| 2005/0080691 A1* | 4/2005 | Holm-Blagg ......... G06Q 40/04 705/30 |
| 2005/0086075 A1 | 4/2005 | Kaehler et al. |
| 2005/0154662 A1 | 7/2005 | Langenwalter |
| 2005/0164151 A1 | 7/2005 | Klein |
| 2005/0187804 A1 | 8/2005 | Clancy et al. |
| 2005/0240431 A1 | 10/2005 | Cotter |
| 2005/0282126 A1 | 12/2005 | Pesso |
| 2006/0064378 A1 | 3/2006 | Clementz et al. |
| 2006/0069635 A1 | 3/2006 | Ram et al. |
| 2006/0095331 A1 | 5/2006 | O'Malley et al. |
| 2006/0100919 A1 | 5/2006 | Levine |
| 2006/0122922 A1 | 6/2006 | Lowenthal |
| 2006/0122923 A1 | 6/2006 | Burke |
| 2006/0149609 A1 | 7/2006 | Stenerson et al. |
| 2006/0163341 A1 | 7/2006 | Tulluri et al. |
| 2006/0178971 A1 | 8/2006 | Owen et al. |
| 2006/0224478 A1 | 10/2006 | Harbison et al. |
| 2006/0235777 A1* | 10/2006 | Takata .................. G06Q 40/00 705/35 |
| 2006/0242084 A1 | 10/2006 | Moses |
| 2006/0277091 A1 | 12/2006 | Kochikar et al. |
| 2006/0277128 A1 | 12/2006 | Anandarao et al. |
| 2006/0282353 A1 | 12/2006 | Gikandi |
| 2006/0282369 A1 | 12/2006 | White |
| 2007/0005477 A1 | 1/2007 | McAtamney |
| 2007/0005524 A1 | 1/2007 | Iwachin |
| 2007/0034688 A1 | 2/2007 | Burke |
| 2007/0038545 A1 | 2/2007 | Smith et al. |
| 2007/0038610 A1 | 2/2007 | Omoigui |
| 2007/0055549 A1 | 3/2007 | Moore et al. |
| 2007/0055602 A1 | 3/2007 | Mohn |
| 2007/0060109 A1 | 3/2007 | Ramer et al. |
| 2007/0060173 A1 | 3/2007 | Ramer et al. |
| 2007/0061252 A1 | 3/2007 | Burke |
| 2007/0061257 A1 | 3/2007 | Neofytides et al. |
| 2007/0061333 A1 | 3/2007 | Ramer et al. |
| 2007/0083465 A1 | 4/2007 | Ciurea et al. |
| 2007/0094130 A1 | 4/2007 | Burke |
| 2007/0100749 A1 | 5/2007 | Bachu et al. |
| 2007/0112662 A1 | 5/2007 | Kumar |
| 2007/0136194 A1 | 6/2007 | Sloan |
| 2007/0156519 A1 | 7/2007 | Agassi et al. |
| 2007/0162301 A1 | 7/2007 | Sussman et al. |
| 2007/0162387 A1 | 7/2007 | Cataline et al. |
| 2007/0179841 A1 | 8/2007 | Agassi et al. |
| 2007/0185721 A1 | 8/2007 | Agassi et al. |
| 2007/0192318 A1 | 8/2007 | Ramer et al. |
| 2007/0208588 A1 | 9/2007 | Rhoades et al. |
| 2007/0208624 A1 | 9/2007 | Gallagher |
| 2007/0214162 A1 | 9/2007 | Rice |
| 2007/0231777 A1 | 10/2007 | Dimarco |
| 2007/0241120 A1 | 10/2007 | Henry |
| 2007/0255965 A1 | 11/2007 | McGucken |
| 2007/0298392 A1 | 12/2007 | Mitchell |
| 2008/0015970 A1 | 1/2008 | Brookfield et al. |
| 2008/0015988 A1 | 1/2008 | Brown et al. |
| 2008/0040845 A1 | 2/2008 | Shoshan |
| 2008/0060241 A1 | 3/2008 | Molinaro |
| 2008/0120129 A1 | 5/2008 | Seubert et al. |
| 2008/0133393 A1 | 6/2008 | Arnold et al. |
| 2008/0140559 A1 | 6/2008 | Ram et al. |
| 2008/0183545 A1 | 7/2008 | Deitrich et al. |
| 2008/0195512 A1 | 8/2008 | Klebanoff et al. |
| 2008/0195556 A1 | 8/2008 | Vioni |
| 2008/0201208 A1 | 8/2008 | Tie et al. |
| 2008/0208638 A1 | 8/2008 | Davidson et al. |
| 2008/0243716 A1 | 10/2008 | Ouimet et al. |
| 2008/0249936 A1 | 10/2008 | Miller et al. |
| 2008/0319781 A1 | 12/2008 | Stivoric et al. |
| 2009/0006418 A1 | 1/2009 | O'Malley |
| 2009/0063353 A1* | 3/2009 | Viidu .................... G06Q 40/02 705/40 |
| 2009/0092241 A1 | 4/2009 | Minert et al. |
| 2009/0094170 A1 | 4/2009 | Mohn |
| 2009/0112674 A1 | 4/2009 | Musso et al. |
| 2009/0119013 A1 | 5/2009 | O'Malley |
| 2009/0132313 A1 | 5/2009 | Chandler et al. |
| 2009/0138341 A1 | 5/2009 | Mohan et al. |
| 2009/0177688 A1 | 7/2009 | Karlsen et al. |
| 2009/0182664 A1 | 7/2009 | Trombley |
| 2009/0192874 A1 | 7/2009 | Powles et al. |
| 2009/0204448 A1 | 8/2009 | Kaehler et al. |
| 2009/0204455 A1 | 8/2009 | Rubin |
| 2009/0204538 A1 | 8/2009 | Ley et al. |
| 2009/0216641 A1 | 8/2009 | Hubbard |
| 2009/0234697 A1 | 9/2009 | Taguchi |
| 2009/0254469 A1 | 10/2009 | Robertson |
| 2009/0276231 A1 | 11/2009 | Bazigos et al. |
| 2009/0276258 A1 | 11/2009 | Dane |
| 2009/0292648 A1 | 11/2009 | Damschroder et al. |
| 2009/0319289 A1 | 12/2009 | Pande |
| 2009/0319344 A1 | 12/2009 | Tepper et al. |
| 2009/0327051 A1 | 12/2009 | Nerby |
| 2009/0327106 A1 | 12/2009 | Bartelt et al. |
| 2010/0023385 A1 | 1/2010 | Galvan |
| 2010/0030671 A1 | 2/2010 | Gelerman |
| 2010/0031157 A1 | 2/2010 | Neer et al. |
| 2010/0063981 A1 | 3/2010 | Thomsen |
| 2010/0070323 A1 | 3/2010 | Polcari et al. |
| 2010/0070448 A1 | 3/2010 | Omoigui |
| 2010/0100424 A1 | 4/2010 | Buchanan et al. |
| 2010/0100427 A1 | 4/2010 | McKeown et al. |
| 2010/0100464 A1 | 4/2010 | Ellis et al. |
| 2010/0100469 A1 | 4/2010 | Buchanan et al. |
| 2010/0100470 A1 | 4/2010 | Buchanan et al. |
| 2010/0100561 A1 | 4/2010 | Cooper et al. |
| 2010/0106566 A1 | 4/2010 | Al-Otaibi et al. |
| 2010/0114672 A1 | 5/2010 | Klaus et al. |
| 2010/0125475 A1 | 5/2010 | Twyman |
| 2010/0131306 A1 | 5/2010 | Koo |
| 2010/0145861 A1 | 6/2010 | Law et al. |
| 2010/0145876 A1 | 6/2010 | Pessin |
| 2010/0153211 A1 | 6/2010 | Ramer et al. |
| 2010/0179916 A1 | 7/2010 | Johns et al. |
| 2010/0180029 A1 | 7/2010 | Fourman |
| 2010/0198863 A1 | 8/2010 | Lee et al. |
| 2010/0217652 A1 | 8/2010 | Brooks Rix |
| 2010/0235299 A1 | 9/2010 | Considine |
| 2010/0287086 A1 | 11/2010 | Harris et al. |
| 2010/0299277 A1 | 11/2010 | Emelo et al. |
| 2010/0306017 A1 | 12/2010 | Dreyfuss et al. |
| 2010/0312713 A1 | 12/2010 | Keltner |
| 2010/0312718 A1 | 12/2010 | Rosenthal et al. |
| 2010/0332379 A1 | 12/2010 | Ram et al. |
| 2011/0173118 A1 | 7/2011 | Hu |
| 2011/0276494 A1 | 11/2011 | Hutchinson et al. |
| 2011/0282803 A1 | 11/2011 | Woods et al. |

OTHER PUBLICATIONS

"How can I automatically generate an index in Word?," printed from http://word.mvps.org/faqs/formatting/CreateIndexContent.htm, Internet site, accessed on Feb. 17, 2011, 4 pages.

"PeopleSoft Enterprise Human Capital Management—Employee Benefits and Compensation Modules," printed from http://www.2020software.comproducts/PeopleSoft_Enterprise_Human_Capital_Management_Employee_Benefits-and_Compensation_Modules.asp., Internet site, accessed on Jul. 17, 2011, 7 pages.

"FREE Online Employee Attendance Tracking Software," printed from http://www.tracksmart.com, Internet site, accessed on Jul. 17, 2011, 2 pages.

"Compensation Software Solutions for Small Business { Taleo," printed from http://www.taleo.com/solutions/taleo-business-edition-comp?_kk*HR%, Internet site, accessed on Jul. 17, 2011, 1 page.

"Tracking training has never been so easy," printed from http://www.conductit.com/, Internet site, accessed on Jul. 17, 2011, 2 pages.

(56) References Cited

OTHER PUBLICATIONS

"Track Employee Training Easily with Conductor® Employee Education Training Tracking Software," printed from http://www.conductit.com/product.asp, Internet site, accessed on Jul. 17, 2011, 2 pages.
"HSBC Employee Career Track Information," printed from http://www.hsbcusa.com/careers/hsbc_employees/impacted_employee_information.html, Internet site, accessed on Jul. 17, 2011, 2 pages.
"Conductor® at a glance Take the Quick Tour!" printed from http://www.conductit.com/tour.asp#1, Internet site, accessed on Jul. 17, 2011, 11 pages.
"Replicon—Time Tracking made Easy with Web TimeSheet," printed from http://www.replicon.com/lp/lp_ta_vacation_tracking.aspx?, Internet site, accessed on Jul. 17, 2011, 2 pages.
U.S. Appl. No. 12/152,028, filed May 12, 2008.
U.S. Appl. No. 12/152,074, filed May 12, 2008.
U.S. Appl. No. 12/120,995, filed May 15, 2008.
U.S. Appl. No. 12/479,378, filed Jun. 5, 2009.
U.S. Appl. No. 12/696,647, filed Jan. 29, 2010.
U.S. Appl. No. 13/037,063, filed Feb. 28, 2011.
U.S. Appl. No. 13/037,072, filed Feb. 28, 2011.
U.S. Appl. No. 13/037,086, filed Feb. 28, 2011.
U.S. Appl. No. 13/037,096, filed Feb. 28, 2011.
U.S. Appl. No. 12/803,707, filed Jul. 2, 2010.
U.S. Appl. No. 12/803,706, filed Jul. 2, 2010.
U.S. Appl. No. 12/754,967, filed Jul. 2, 2010.
U.S. Appl. No. 12/696,959, filed Jan. 29, 2010.
U.S. Appl. No. 12/754,974, filed Apr. 6, 2010.
U.S. Appl. No. 12/803,705, filed Jul. 2, 2010.
U.S. Appl. No. 12/803,684, filed Jul. 2, 2010.
U.S. Appl. No. 13/324,575, filed Dec. 13, 2011.
U.S. Appl. No. 13/324,596, filed Dec. 13, 2011.
U.S. Appl. No. 13/355,056, filed Jan. 20, 2012.
Ronald Lipman, "Adding family to credit card not always wise," *Houston Chronicle*, dated Jan. 18, 2008, printed from chron.com, 2 pages.
Lawrence Kutner, "Parent & Child," *The New York Times*, dated Aug. 19, 1993, printed from http://query.nytimes.com/gst/fullpage.html?res=9F0CE1DA153CF93AA2575BC0A965958260&sec=&, Internet site, accessed on Feb. 1, 2008, 3 pages.
Jane J. Kim, "Managing Your Money in Public View," *The Wall Street Journal*, dated Jun. 14, 2007, printed from http://online.wsj.com/article/SB118177906703834565.html, Internet site, Accessed on Apr. 11, 2008, 5 pages.
"Obopay—Money Transfer by Cell Phone or Web," printed from https://www.obopay.com/consumer/GetHelp.do?target=HelpHowWorks, Internet site, accessed on Apr. 11, 2008, 4 pages.
"BillMonk.com," printed from https://www.billmonk.com/about/tour, Internet site, accessed on Apr. 11, 2008, 8 pages.
"Split It by TD Canada Trust Facebook," printed from http://www.facebook.com/apps/appiication.php?id-4245957541&ref=nf, Internet site, accessed on Apr. 11, 2008, 2 pages.
"ING Direct Electric Orange Checking Account," printed from http://banking.about.com/od/checkingaccounts/p/ingchecking.htm, Internet site, accessed on Apr. 11, 2008, 1 page.
"Know your financial health—at a glance!" printed from http://www.buxfer.com/tour.php?id=HomePage, Internet site, accessed on Apr. 11, 2008, 1 page.
"Use Buxfer's analytics to understand your finances," printed from http://www.buxfer.com/tour.php?id-Analytica, Internet site, accessed on Apr. 11, 2008,1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id~Reporting, Internet site, accessed on Apr. 11, 2008, 1 page.
"Import statements from banks or credit card accounts," printed from http://www.buxfer.com/tour.php?id=Import, Internet site, accessed on Apr. 11, 2008,1 page.
"Slice and dice through your transactions," printed from http://www.buxfer.com/tour.php?=Filters, Internet site, accessed on Apr. 11, 2008, 1 page.
"Transfer money online with Amazon Payments," printed from http://www.buxfer.com/tour.php?id=Send_money, Internet site, accessed on Apr. 11, 2008, 1 page.
"Setup budgets to control your expenses," printed from http://www.buxfer.com/tour.php?id=Budgets, Internet site, accessed on Apr. 11, 2008, 1 page.
"Access Buxfer while on the move!" printed from http://www.buxfer.com/tour.php?id=Mobile, Internet site, accessed on Apr. 11, 2008, 1 page.
"Take Buxfer with you on the Internet everywhere!" printed from http://www.buxfer.com/tour.php?id=Gadgets, Internet site, accessed on Apr. 11, 2008,1 page.
"Amazon Payments Account Management," printed from https://payments.amazon.com/sdui/sdui/paymentabout?about=true, Internet site, accessed on Apr. 11, 2008, 1 page.
"Living with a Roommate in Memphis," memphis apartmentstv.com, dated Feb. 15, 2007, printed from http://www.memphisapartmentstv.com/living-with-a-roommate-in-memphis/, Internet site, accessed on Sep. 18, 2007, 2 pages.
"Billshare—a simple app for people who share bills," printed from http://billshare.org/, Internet site, accessed on Sep. 18, 2007, 2 pages.
"Get More from Your PayPal Account," printed from https://www.paypal.com/us/cgi-bin/webscr?cmd=xpt/cps/general/AccountOverview-outside, Internet site, accessed on Sep. 18, 2007, 2 pages.
"How PayPal Works—PayPal," printed from https://www.paypal.com/us/cgi-bin/websor?cmd=xpt/cps/general/NewConsumerWorks-outside, Internet site, accessed on Sep. 18, 2007, 3 pages.
"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.
"Track Your Online Spending," printed from https://www.paypal.com/us/cgi-bin/webscr?cmd-xpt/cps/general/TrackingMoney-outside, Internet site, accessed on Sep. 18, 2007, 2 pages.
"Enter Details—PayPal," printed from https://www.paypal.com/us/cql-bin/webscr?cmd=_flow&SESSION=6paX9BKc4FK4EJ8, Internet site, accessed on Sep. 18, 2007, 1 page.
"Review Payment Details—PayPal," printed from htps://www.paypal.com/us/cgi.bin/webscr?cmd=_flow&SESSION=RMXX7KRminYnF, Internet site, accessed on Sep. 18, 2007, 1 page.
"Savings Plan," printed from http://quicken.intuit.com/images/screenshots/ss_savings_plan_lrg.gif, Internet site, accessed on Mar. 19, 2008, 1 page.
"Quicken Deluxe 2008," printed from http://quicken.intuit.com/personai-finance/deluxe-money-management.jhtml, Internet site, accessed on Mar. 19, 2008, 7 pages.
"SMS Banking," brochure by Acette Technologies FZ LLC, dated 2007, 3 pages.
Tim Ferguson, "Mobile banking rolled out by HSBC," dated Oct. 4, 2006, printed from http://www.silicon.com/financialservices/0,3800010322,39162983,00.htm, Internet site, Accessed on Oct. 11, 2007, 2 pages.
Julian Goldsmith, "Cashing in on the ATM revolution," dated May 2, 2007, printed from http://www.silicon.com/financialservices/0,3800010322,39166938,00.htm, Internet site, Accessed on Oct. 11, 2007, 3 pages.
Shelley Elmblad, "Online Banking is Easy on Budgets," dated May 22, 2007, printed from http//building-personal-savings.suite101.com/article.cfm/online_banking_get_the_facts, Internet site, accessed on Oct. 12, 2007, 2 pages.
John R. Quain, "Cellphone Banking Is Coming of Age," dated May 24, 2007, printed from http://www.nytimes.com/2007/05/24/technoloqy/24basics.html?r=1&oref=slogin, Internet site, Accessed on Oct. 12, 2007, 4 pages.
"Ducont—Mobile Payments," printed from http://www.ducont.com/Products/bnf_mdhm.htm, Internet site, accessed on Oct. 11, 2007, 1 page.

(56) References Cited

OTHER PUBLICATIONS

"Ducont—Bank.companion," printed from http://www.ducont.com/Products/bnf_bankcomp.htm, Internet site, accessed on Oct. 11, 2007, 1 page.

"MyCheckFree.com," printed from https://mycheckfree.com/br/wps?sp=10001&rq=bfbl, Internet Site, accessed on Sep. 14, 2007,1 page.

"About CheckFree," printed from https://mycheckfree.com/br/wos?rq=login&slpg=Y&file=authentication/login_baseline_about-checkfree&esc=93096239&sp=, Internet site, accessed on Sep. 14, 2007, 1 page.

"MyCheckFree=Frequently Asked Questions," printed from https://mycheckfree.com/br/wps?rq=login&slpg=Y&file=authentication/login_baseline_faq&esc=93096239&sp=10001, Internet site, accessed on Sep. 14, 2007, 5 pages.

"Paytrust: Paying Bills Has Never Been Easier," printed from http://www.paytrust.com/learnmore.shtml, Internet site, accessed on Sep. 14, 2007, 2 pages.

"Why Use Paytrust® Instead of a Traditional Bill-Pay Service?" printed from http://www.paytrust.com/morethanbillpay.shtml, Internet site, accessed on Sep. 14, 2007, 3 pages.

"Paytrust: Frequently Asked Questions," printed from http://www.paytrust.com/commonquestions.shtml, Internet site, accessed on Sep. 14, 2007, 5 pages.

Richard Irons, "What is Envelope Budgeting—Why the Envelope Budgeting System is so Effective?" printed from http://www.mvelopes.com/articles/envelope-budgeting.php, Internet site, 3 pages.

"Pocket Quicken," printed from http://www.landware.com/pocketquicken, Internet site, Accessed on Sep. 14, 2007, 2 pages.

"Mobile Quicken™ —Stand Alone or Connect with a Click," printed from http://www.landware.com/pocketquicken/moreinfo.html, Internet site, accessed on Sep. 14, 2007, 4 pages.

"UnitedOne Credit Union," printed from http://www.unitedone.org/ASP/home.asp, Internet site, Accessed on Sep. 14, 2007, 3 pages.

"UnitedOne Credit Union—Calendar Help," printed from https://s146.lanxtra.com/servlet/EchoTemplateServlet?template=/2/en/IBHelp.vm&help-10901, Internet site, accessed on Sep. 14, 2007, 5 pages.

"Quicken Starter Edition 2008," printed from http://quicken.intuit.com/personal-finance/starter-edition-personal-budget.jhtml, Internet site, accessed on Sep. 14, 2007, 5 pages.

"Jul. 2007 calendar," printed from http://quicken.intuit.com/images/screenshots/ss_calendar_lrg.gif, Internet site, accessed on Sep. 14, 2007, 1 page.

"Navigator," dated Jul. 2006, printed from www.pscu.org, Internet site accessed on Oct. 17, 2007, 2 pages.

"Bank of America Privacy Assist Premier™ —Protect your credit and identity," printed from http://www.bankofamerica.com/pap/index.cfm?template-pap_assist_premier, Internet site, Accessed on Oct. 17, 2007, 2 pages.

"Identity Theft Protection—Bank of America Privacy Assist Premier™," printed from http://www.bankofamerica.com/pap/index.cfm?assist_premier, Internet site, Accessed on Oct. 17, 2007, 2 pages.

"Bank of America—Online Bill Pay and e-Bills Frequently Asked Questions," printed from http://www.bankofamerica.com/onlinebanking/index.cfm?template=faq_billpay, Internet site, Accessed on Oct. 17, 207, 2 pages.

"Technology Credit Union," printed from http://www.techcu.com/resources/about_tech_cu/privacy/online.htm, Internet site, accessed on Oct. 17, 2007, 1 page.

"Billshare.org—Make Bill Paying with Roomies Easy—KillerStartups.com," printed from http://www.killerstartups.com/Web20/billshare--Make-Bil-Paying-with-Roomies-Easy/, Internet Site, accessed on Sep. 18, 2007, 4 pages.

Every Penny Counts, Inc., Patent Property Due Diligence Chart, prepared Aug. 30, 2007, 8 pages.

David A. Moss, Gibbs A. Johnson, "The rise of consumer bankruptcy: Evolution, revolution, or both?" *American Bankruptcy Law Journal*, v. 73, n. 2, pp. 311-351, Spring 1999, printed from http://dialogquicksearch.dialog.com/USPTO/search/getDocument.action.action?r=cb38039-dcc8, Internet site, accessed on Sep. 26, 2010, 25 pages.

Phillip Robinson, "Mastering Your Money," *San Jose Mercury News*, Oct. 9, 1994, 3 pages.

Tom Rawstorne, "What's your child buying online?; Alcohol, knives, pornography . . . All bought over the internet by a 14-year-old boy using a debit card. So why are the banks giving them to children without telling their parents?" Daily Mail, London, Jul. 10, 2008, p. 50, retrieved Jun. 30, 2011, 5 pages.

CNNmoney.com, "What are you worth?" printed from http://web.archive.org/web/20021008185050/http://cgi.money.cnn.com/tools/networth/networth.html, Internet site, accessed on Jul. 13, 2011, 2 pages.

Office Action dated Sep. 28, 2010 for U.S. Appl. No. 12/152,073, filed May 12, 2008.

Notice of Allowance dated May 3, 2011 for U.S. Appl. No. 12/152,073, filed May 12, 2008.

Office Action dated Apr. 2, 2009 for U.S. Appl. No. 12/152,028, filed May 12, 2008.

Office Action dated Sep. 16, 2009 for U.S. Appl. No. 12/152,028, filed May 12, 2008.

Office Action dated Jun. 15, 2010 for U.S. Appl. No. 12/152,028, filed May 12, 2008.

Office Action dated Oct. 1, 2010 for U.S. Appl. No. 12/152,074, filed May 12, 2008.

Office Action dated Apr. 13, 2010 for U.S. Appl. No. 12/120,995, filed May 15, 2008.

Notice of Allowance dated Sep. 23, 2010 for U.S. Appl. No. 12/120,995, filed May 15, 2008.

Notice of Allowance dated Jul. 11, 2011 for U.S. Appl. No. 12/172,541, filed Jul. 14, 2008.

Office Action dated Jul. 8, 2011 for U.S. Appl. No. 12/366,711, filed Feb. 6, 2009.

Office Action dated Aug. 4, 2011 for U.S. Appl. No. 12/479,378, filed Jun. 5, 2009.

Office Action dated Jan. 3, 2012 for U.S. Appl. No. 12/696,959, filed Jan. 29, 2010.

Office Action dated Mar. 21, 2012 for U.S. Appl. No. 12/366,711, filed Feb. 6, 2009.

Office Action dated Mar. 15, 2012 for U.S. Appl. No. 12/479,378, filed Jun. 5, 2009.

Office Action dated Mar. 12, 2012 for U.S. Appl. No. 13/300,940, filed Nov. 21, 2011.

Office Action dated Feb. 1, 2012 for U.S. Appl. No. 12/696,647, filed Jan. 29, 2010.

"Adobe's 14th Street Billboard: Interactive, But Recessed," Gothamist, downloaded from http://gothamist.com/2007/07/13/adobes_new_14th.php on Aug. 28, 2009.

"Interactive Wall Technology: Seeing the Big Picture," Accenture, downloaded from http://www.accenture.com/Global/Services/Accenture_Technology_Labs/Services/SeeingTheBigPicture.htm on Sep. 3, 2009.

"Interactive Graffiti Billboard Lets You Be Simultaneously Tough and Geeky," Gizmodo, Aug. 23, 2007, downloaded from http://gizmodo.com/292933/interactive-graffiti-biliboard-lets-you-be-simultaneously-tough-and-geeky on Aug. 28, 2009.

"Toshiba Interactive Digital Billboard," ubergizmo, Mar. 27, 2009, downloaded from http://www.ubergizmo.com/15/archives/2009/03/toshiba_interactive_digital_billboard.html on Sep. 28, 2009.

"FD kinesis launches an interactive billboard in Times Square for Coldwell Banker," Jul. 14, 2009, downloaded from http://kinesismomentum.wordpress.com/2009/07/14/fd-kinesis-launches-an-interactive-billboard-in-times-square-for-coldwell-banker/ on Oct. 21, 2010.

"What Investor Personality Do You Have?" Associated Content, May 13, 2009, downloaded from http://www.associatedcontent.com/article/1760724/what_investor_personality_do_you_have on Aug. 24, 2009.

"Interactive Investor Profile Tool," Southside Bank, downloaded from http://www.southsidetrust.com/tool.himl on Aug. 27, 2009.

(56) References Cited

OTHER PUBLICATIONS

"Mutual Fund Investor Profile Quiz," TheStreet.com, downloaded from http://www.thestreetratings.com/Products/FreeTools/FundsQuiz.asp on Aug. 27, 2009.

"What Type of Investor Are You? How Investor Profiling Is Changing the Way Investment Advice Is Given," downloaded from http://www.psychonomics.com/research/a&s/profiling.htm on Aug. 24, 2009.

"Understanding Risk," MoneyInstructor.com, downloaded from http://www.moneyinstructor.com/art/risktypes.asp on Mar. 11, 2010.

"Mark Tier's Investor Personality Profile," downloaded from http://www.marktier.com/Main/ipp.php on Mar. 11, 2010.

"The Key to Reducing Investing Mistakes? Understand Your Investing Personality," Merrill Lynch, Nov. 10, 2004, downloaded from http://www.ml.com on Mar. 11, 2010.

"Determining Your Investment Personality," Pacific Life, downloaded from http://www.annuities.pacificlife.com on Mar. 11, 2010.

"Anatomy of an Investor," The University of Texas at Austin, downloaded from http://www.utexas.edu/features/2009/01/26/investors/ on Mar. 11, 2010.

"Investor Personality Test," MarketPsych LLC, downloaded from http://www.marketpsych.com/test_question.php?id=8 on Mar. 11, 2010.

"Lifestyle investor profile," John Hancock Funds, LLC, Apr. 2009.

"Investor Profiling: The Foundation for Building a Dominant Wealth Advisory Business," Concord Canada, downloaded from http://highviewfin.com on Mar. 11, 2010.

Yahoo! UI Library: Slider, accessed via Way Back Machine, Oct. 6, 2006, http://web.archive.org/web/20061006221351/http://developer.yahoo.com/yui/slider/, on Mar. 8, 2012, 3 pages.

Office Action dated Apr. 18, 2012 for U.S. Appl. No. 13/037,063, filed Feb. 28, 2011.

\* cited by examiner

FROM FIG. 2A

No Scheduled Bills — 85    (Add Bill)

Tips of use:

This section will list your bill payments from the day you schedule them until the day the money actually leaves your account.

Schedule your first bill payment here.

Total Scheduled Out:    $0.00

Reserve — 105    (Add Item)

Tips of use:

This section will list your wish list items and the defined allocation of your Reserve fund.

Create your first wish item here.

Unallocated:    $175.00

Interest on Reserve (1.1%): $0.30

Total Savings:    $175.00

Transfer Money:    From: (Choose Account ▽)    To: (Choose Account ▽)    Amount: [____] (Go)

FIG. 2B

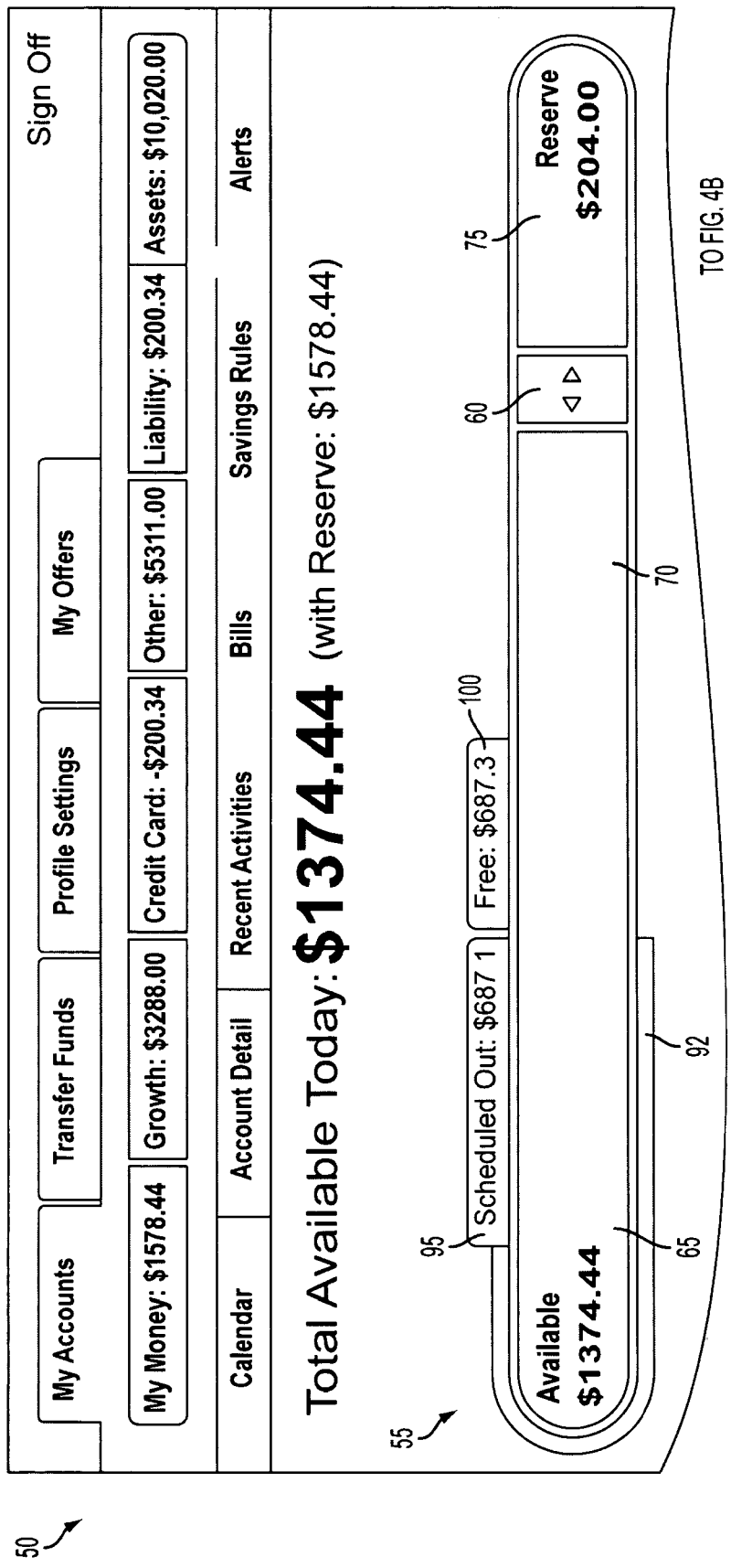

FROM FIG. 4A

85 —

Scheduled Out (until Sep 25th) (Add Bill)

T-Mobile
Scheduled for 9/19/07     $87.14

Geico
Scheduled for 9/23/07   ↻   $600.00

Total Scheduled Out:     $687.14

105 —

Reserve (Add Item) (Edit)

Items you are saving for:
    iPhone     $395.00     $50.00
    New Laptop     $999.00     $30.00

Unallocated:     $124.00

Interest on Reserve (1.1%): $0.30

Total Savings:     $204.00

Transfer Money:   From: (Choose Account ▽)   To: (Choose Account ▽)   Amount: [ ]   (Go)

FROM FIG. 4B

| Future Scheduled Out (after Sept. 25th) | |
|---|---:|
| ComEd<br>Scheduled for 10/03/07 | $26.39 |
| Geico<br>Scheduled for 10/10/07 | $83.00 |
| | |
| | |
| Total Future Scheduled Out: | $654.28 |

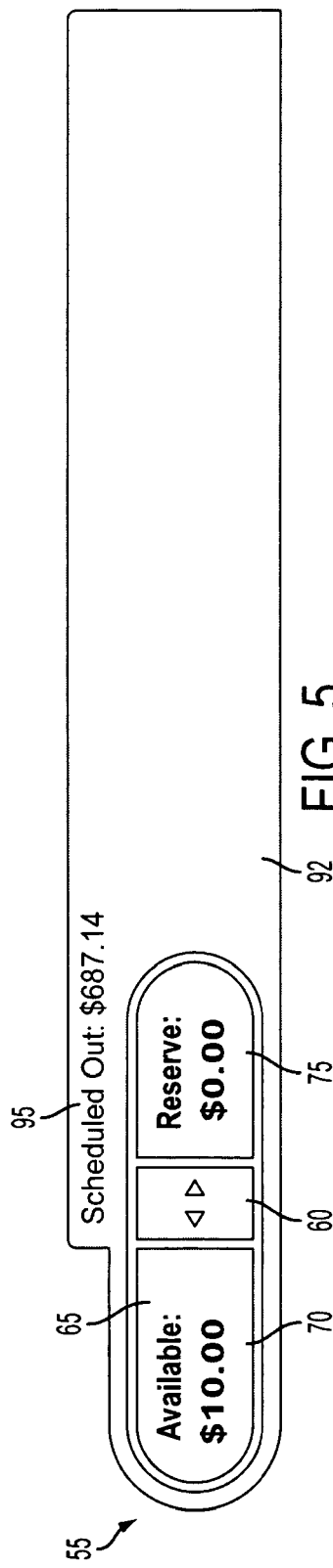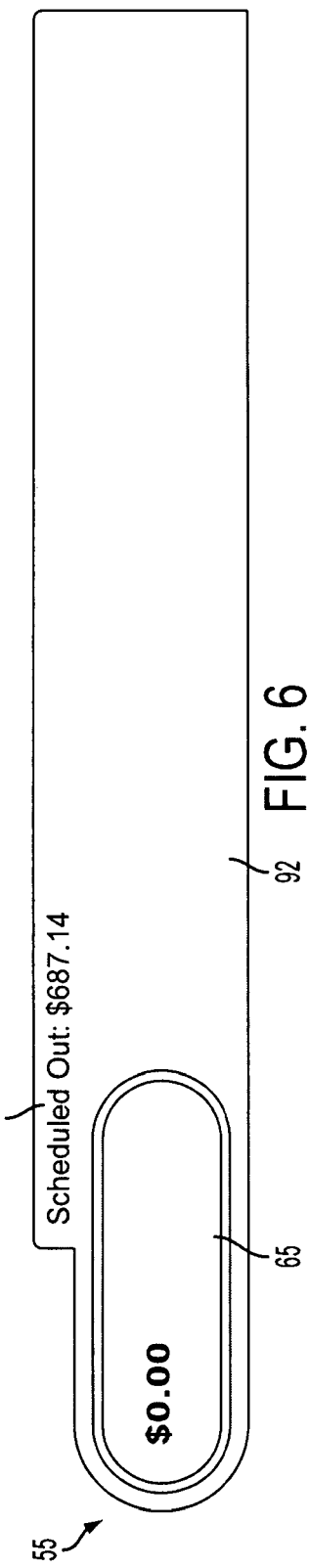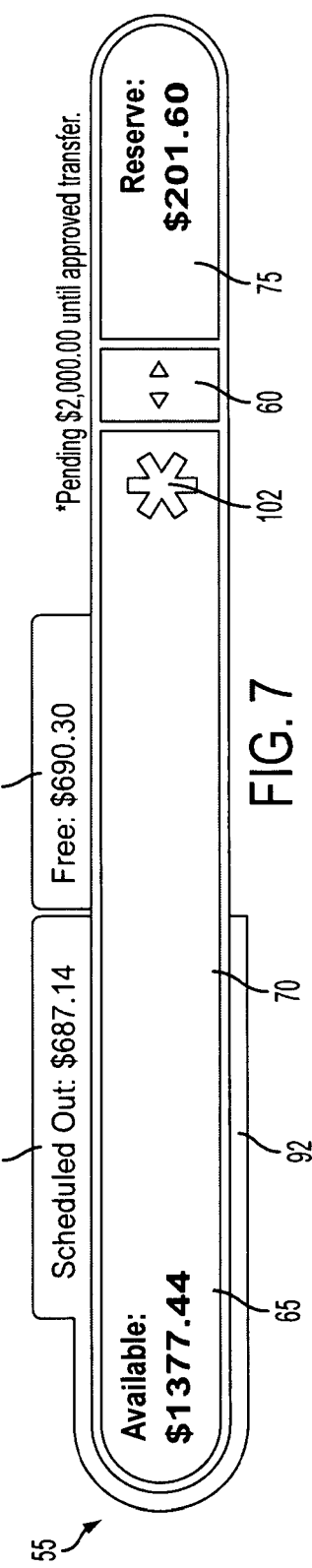

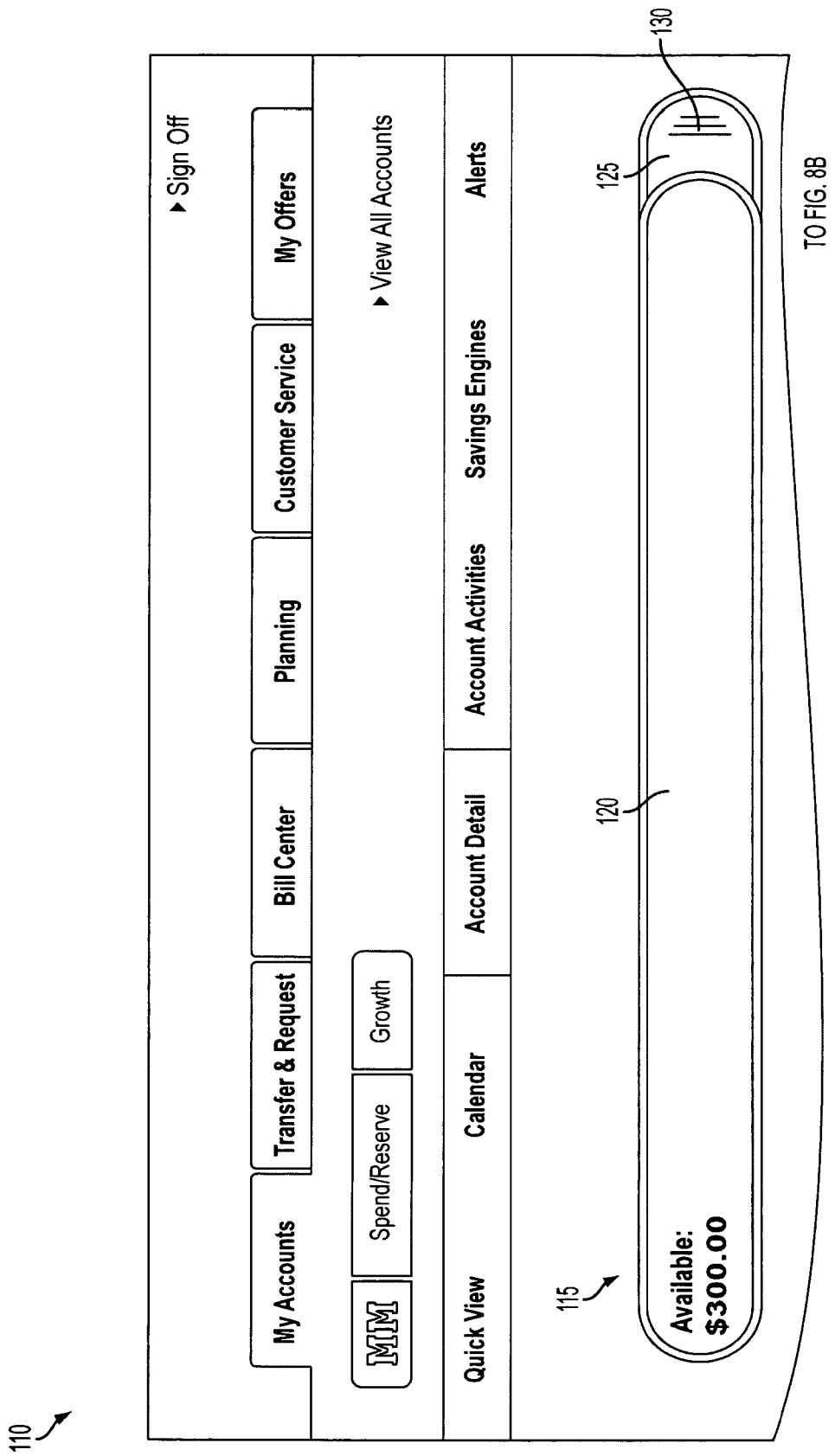

FROM FIG. 8A

Scheduled Out — 170

Tips of use:

This section will list your bill payments from the day you schedule them until the day the money actually leaves your account.

Schedule your first bill payment here.

Add

Total Scheduled Out: $0.00

Transfer: (Between People ▷) — 135    From: (Spend ▷) — 145    To: (Dad ▷) — 150    Amount: $ [50.00] — 155    (Go) — 160

FROM FIG. 9A

Scheduled Out (Add) — 170

Tips of use:

This section will list your bill payments from the day you schedule them until the day the money actually leaves your account.

Schedule your first bill payment here.

Total Scheduled Out: $0.00

Items you've stashed money for: — 175

Mom's Birthday — $50.00 (Edit)
Event Date: 8/31/08

Buy Books — $500.00 (Edit)
Event Date: 9/02/08

AT&T Cellphone Bill — $30.00 (Edit)
Event Date: 10/24/08 iPod — $100.00 (Edit)

Unallocated:
Interest on Reserve YTD (1.1%): $0.00  $680.00 (Add)

Transfer: (Between People ▷) — 135, 140
From: (Spend ▷)  To: (Dad ▷) — 145, 150
Amount: $ 50.00  (Go) — 155, 160

FIG. 9B

Send Money

To: Dad@hotmail.com

Subject: PNC SecureNet Money Transfer

| Item | Amount |
|---|---|
| Dinner at Connie's Pizza | $50.00 |

Hi Dad

Here's what I owe you for dinner. Thanks again!!

Love,
Jane

☐ Send to Mobile (Send) (Cancel)

| Reserve | | | | Add | X |
|---|---|---|---|---|---|
| Item Description | Event Date | Reminder Date | Amount | | |
| Mom's Birthday | 8/31/08 | One Day Ahead | $50.00 | | |
| Buy Books | 9 / 01 / 2008 📅 | Day of Event ▶ <br> One Day Ahead <br> One Week Ahead | $ 500.00 ◆ | Save | Edit Delete |
| AT&T Cellphone Bill | 10/24/08 | | $30.00 | | |
| iPod | Set Event Date | | $ 100.00 ◆ | Save | Edit Delete |
| Unallocated: <br> Interest on Reserve YTD (1.1%): $0.00 | | | $520.00 | | |
| Total Reserve: | | | $1200.00 | | |

FIG. 13A

Do you want to add a Stash item?

Item Description: [Buy Books]

Event Date: [9] / [24] / [2008] [📅]

Reminder Date: [Day of Event ▶]

Amount: $ [500.00] ⬍

(Save) (Cancel)

180

FIG. 13B

USER INTERFACES AND SYSTEM INCLUDING SAME

CROSS REFERENCE TO RELATED APPLICATION

This application claims priority from the United States Provisional Patent Application having Ser. No. 61/148,763 filed on Jan. 30, 2009, the disclosure of which is incorporated herein by reference.

TECHNICAL FIELD OF THE INVENTION

This application is directed generally and in various embodiments to user interfaces and systems for providing Internet banking products and services.

BACKGROUND

Banking institutions frequently offer Internet banking products and services to their customers as an alternative to traditional "brick and mortar" banking channels. Such products and services are typically provided via a user interface (UI) of a secure banking Web site that is hosted by the bank and that is remotely accessible by its customers using, for example, a personal computer (PC) or other network-enabled device. Products and services that may be offered to Internet banking customers include, for example, account balance inquiries, electronic funds transfers, transaction information downloads, bill presentment and payment, loan applications, and investment services. From a customer standpoint, advantages of Internet banking include the ability to interact with their banking institution any time from virtually any location, the ability to manage their finances from a single source, and increased transactional speed. Internet banking additionally provides significant economic benefits to the banking institution by reducing paper handling and teller interactions.

For banking institutions, customer visualization of and interaction with information presented via the UI plays a large role in determining customer satisfaction and, consequently, customer enrollment and retention. For many customers, the ability to quickly assess and understand their financial condition based on, for example, the amount of money currently available to spend, current and upcoming financial obligations, and as well as their progress in meeting future financial goals, is essential. Similarly, the ability to distribute funds between accounts in a manner that enhances the customer's understanding of his finances is desirable.

Internet banking UIs currently in use do not adequately consolidate and present customer information such that customers may quickly assess financial conditions to determine if any adjustments are necessary. Additionally, to the extent that a user may be able to glean the information necessary to perform such an assessment, distributing funds between accounts is typically performed using text-input features that add little to the customer's understanding of account dynamics.

Moreover, features of Internet banking UIs are usually directed to an adult demographic and do not take into account spending habits and unique banking needs of younger demographics, such as high school and college-aged customers, for example.

DESCRIPTION OF THE FIGURES

FIGS. 2A-2B and 4A-4C illustrate UI screens displayed by a client according to various embodiments;

FIGS. 5-7 illustrate configurations of a slide controller of a UI screen according to various embodiments;

FIGS. 8A-8B and 9A-9B illustrate UI screens displayed by a client according to various embodiments;

FIG. 11 illustrates a UI e-mail sub-screen according to various embodiments;

FIGS. 13A and 13B illustrate UI sub-screens according to various embodiments.

DESCRIPTION

Various embodiments of the present invention are directed generally to a graphical UI that may be provided by a banking institution as a part of its internet banking system. In certain embodiments, the ill may include a slide controller for shifting or redistributing funds between a demand account and a savings account as needed based on current financial needs and/or future financial goals. The graphical design of the controller may be such financial conditions represented by the controller are quickly and efficiently conveyed. For example, the controller may provide an indication of the relative balances of the demand account and the savings account. Additionally, the controller may provide an indication of what portion of the demand account will be consumed by approaching bill payments.

Figure 1:
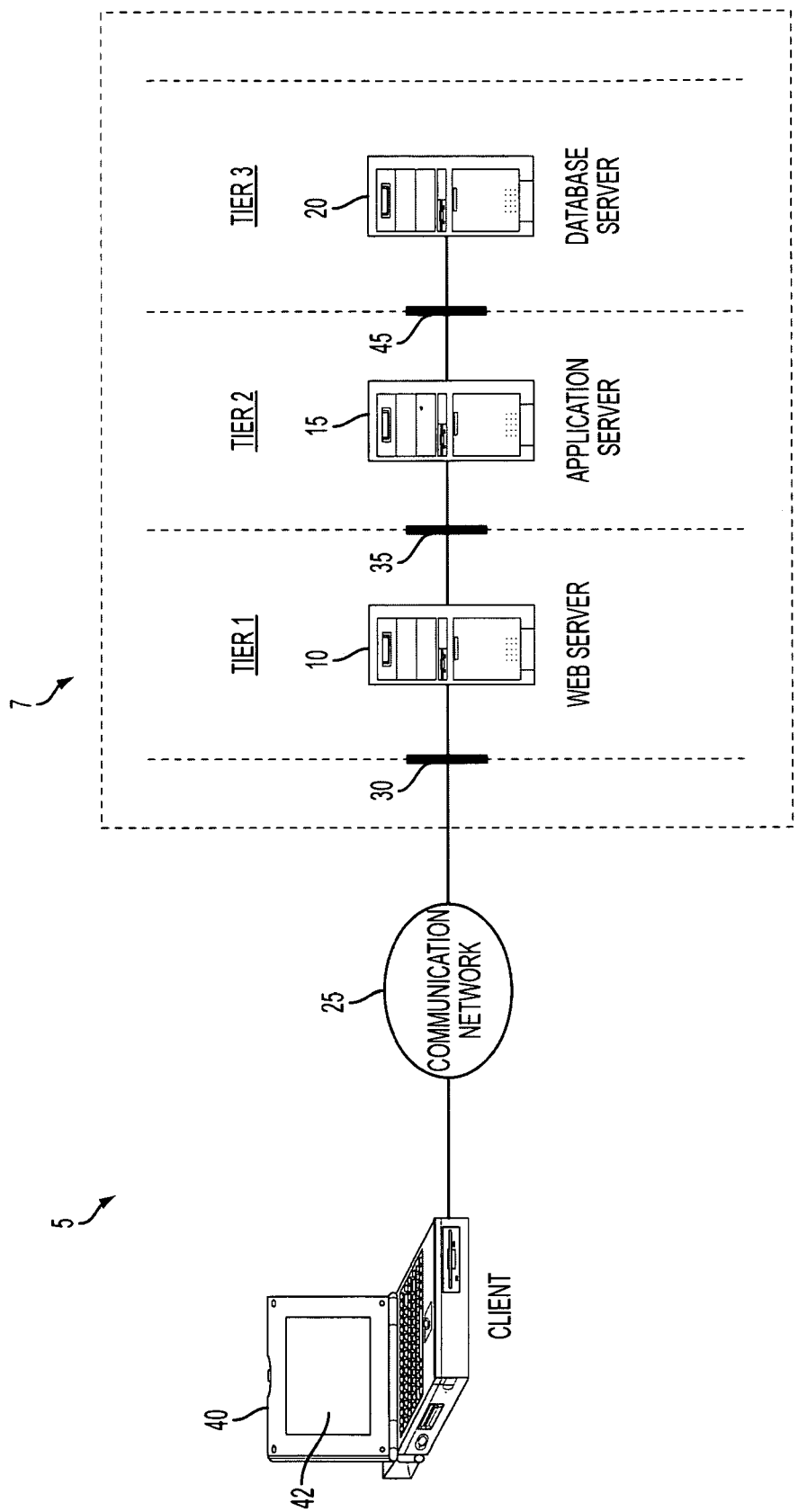
FIG. 1 illustrates a system according to various embodiments.

FIG. 1 illustrates a system 5 according to various embodiments for providing and using Internet banking products and services via a communication network 25. As shown, the system 5 may include a host system 7 in communication with a client 40. In certain embodiments, the host system 7 may be arranged in a 3-tier network architecture and include a Web server 10, an application server 15 and a database server 20. The Web server 10 corresponds to the first tier of the host system 7 and communicates with the communication network 25 (e.g., the Internet) and the application server 15 via a border firewall 30 and an application firewall 35, respectively. The Web server 10 is configured to accept HTTP requests from the client 40 (e.g., a PC or other network-enabled device associated with a customer) via the communication network 25 and provide an HTTP response. The HTTP response may include, for example, static and/or dynamic HTML documents for providing an Internet banking UI 42 to the bank customer via the client 40. The Web server 10 may further be configured to authenticate the customer's credentials before allowing access to the UI 42 and other banking resources. Such authentication may be performed, for example, using a user name and a password.

The application server 15 corresponds to the second tier of the host system 7 and communicates with the Web server 10 and the data base server 20 via the application firewall 35 and an internal firewall 45, respectively. The application server 15 may host Internet banking applications for executing the business logic associated with the Internet banking products and services. The application server 20 may receive customer-entered information from the UI 42 of the client 40 via the Web server 10. Such information may include, for example, the user name and password of the customer and a request to access particular banking products or services. Based on the customer's identity and other information received from the client 40 via the Web server 10, the application server 15 may perform transactions (e.g., transfer funds between accounts, retrieve account balances, etc.) and generate corresponding informational content (e.g., transfer confirmations, account balance information, etc.). Such information may be communicated to the Web server 10 and subsequently presented to the customer using, for example, a dynamic Web page of the UI 42.

The database server 20 corresponds to the third tier of the host system 7 and communicates with the application server 15 via the internal firewall 45. The database server 20 may include one or more databases containing, for example, customer user names and passwords, customer accounts and their respective balances, customer historical transaction information, and products and/or services (e.g., online bill pay) associated with each customer, as well as configuration information for each. Such information may be retrieved, processed and updated as needed by the application server 15 based on the particular Internet banking application(s) being used.

The client 40, as discussed above, may be a PC or other network-enabled device (e.g., a cell phone, PDA, etc.) configured to transmit and receive information via the communication network 25 using a wired or wireless connection. The client 40 may include a suitable browser software application (e.g., Internet Explorer, Internet Explorer Mobile. Firefox, Blazer, etc.) for enabling the customer to display, enter and interact with information exchanged via the communication network 25. The client 40 may thus access and navigate static and/or dynamic HTML documents of the Internet banking UI 42.

Figure 2A:
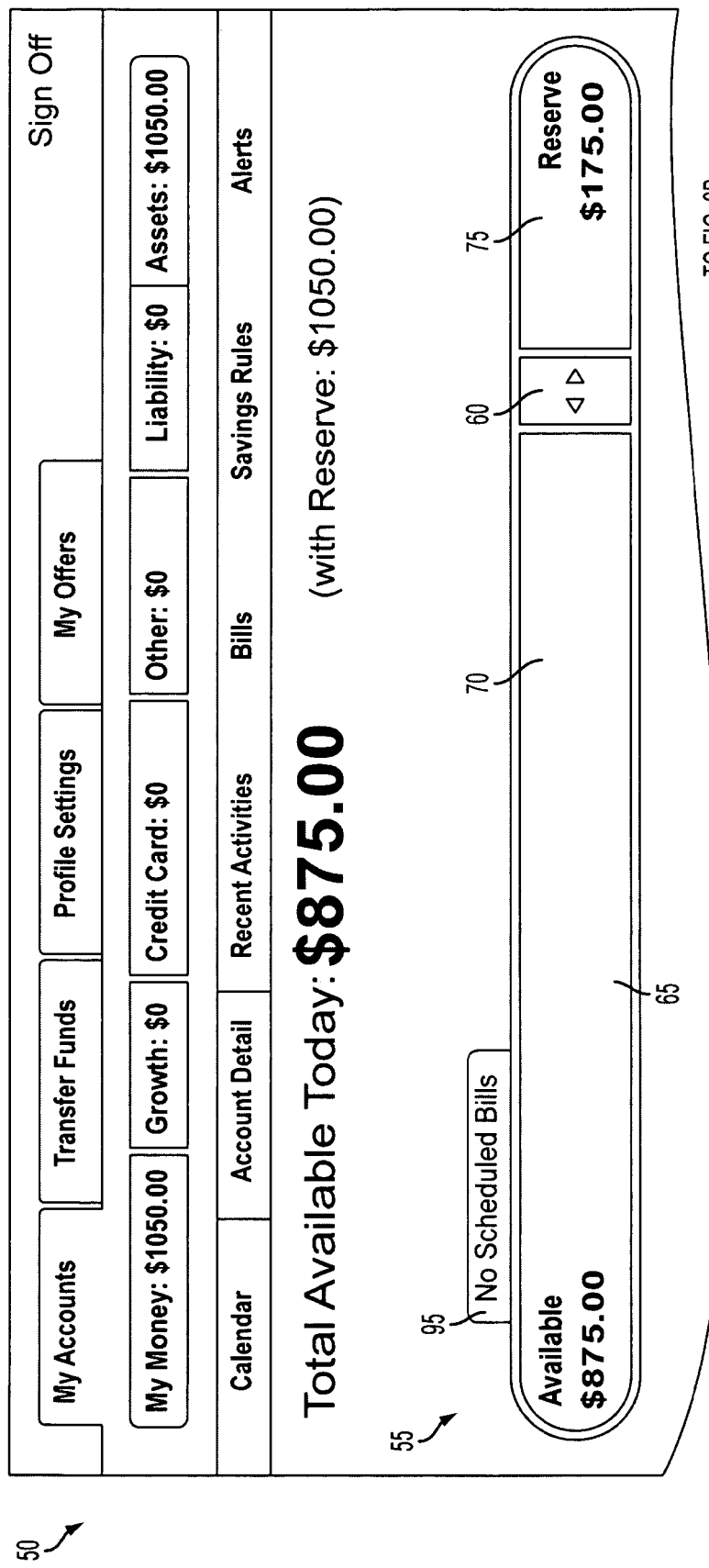

FIGS. 2A-2B illustrate a screen 50 of the UI 42 according to various embodiments for providing Internet banking products and services to a customer. The screen 50 may be implemented, for example, as a dynamic HTML Web page hosted by the Web server 10 that is accessible by the client 40 subsequent to customer authentication. In certain embodiments and as shown, the screen 50 may be one of a plurality of linked screens that collectively define the UI 42. As discussed in further detail below, the screen 50 may include various graphic and text features designed to efficiently communicate information regarding aspects of the customer's finances. Such information may include, for example, a current balance in one or more customer accounts, a portion of a current balance required to satisfy approaching financial obligations, a portion of a current balance allocated toward a particular financial goal, and amounts of scheduled bill payments and associated bill information.

As shown in FIG. 2A, the screen 50 may include an information graphic in the form of a slide controller 55 for displaying and controlling aspects of the customer's finances. In certain embodiments and as shown, the slide controller 55 may be horizontally oriented relative to the screen 50 and include a slidable element 60 that is positionable over a central portion of a background element 65 using, for example, a mouse or other pointing device associated with the client 40. The slidable element 60 may be, for example, a thumb element (as shown in FIG. 2A) or any other suitable type of graphic element that may be selectively positioned relative to the background element 65. The slide controller 55 may be implemented on the interface screen 50 using, for example, JavaScript or other suitable programming tools for generating interactive graphic elements. According to various embodiments, the slide controller 55 may be configured to graphically integrate and display information pertaining to a first account and a second account associated with the customer, and to enable selective redistribution of the account balances based on the customer's financial needs. In certain embodiments and as shown, the first account may be a transactional, or "available," account for providing accessibility to funds on demand using, for example, a check or an electronic funds transfer, and the second account may be a savings, or "reserve," account.

As further shown in FIG. 2A, the background element 65 of the slide controller 55 may be divided into a first segment 70 and a second segment 75 based on the position of the thumb element 60. The lengths of the first and second segments 70, 75 may be representative of the balances contained in the available account and the reserve account, respectively. For example, a first segment 70 that is longer than the second segment 75 may indicate that the balance in the available account exceeds that of the reserve account. The first and second segments 70, 75 may be suitably colored to enhance their contrast for viewing ease. In certain embodiments, for example, the first segment 70 may be green and the second segment 75 may be blue. Labels may be provided on each of the first and second segments 70, 75 to indicate the name and/or type of the corresponding account (e.g., available, reserve) and its balance. The labels may be positioned outside of the central portion of the background element 65 (e.g., at respective endpoints of the background element 65, as shown in FIG. 2A) such that interference with the thumb element 60 is avoided.

Figure 3A:
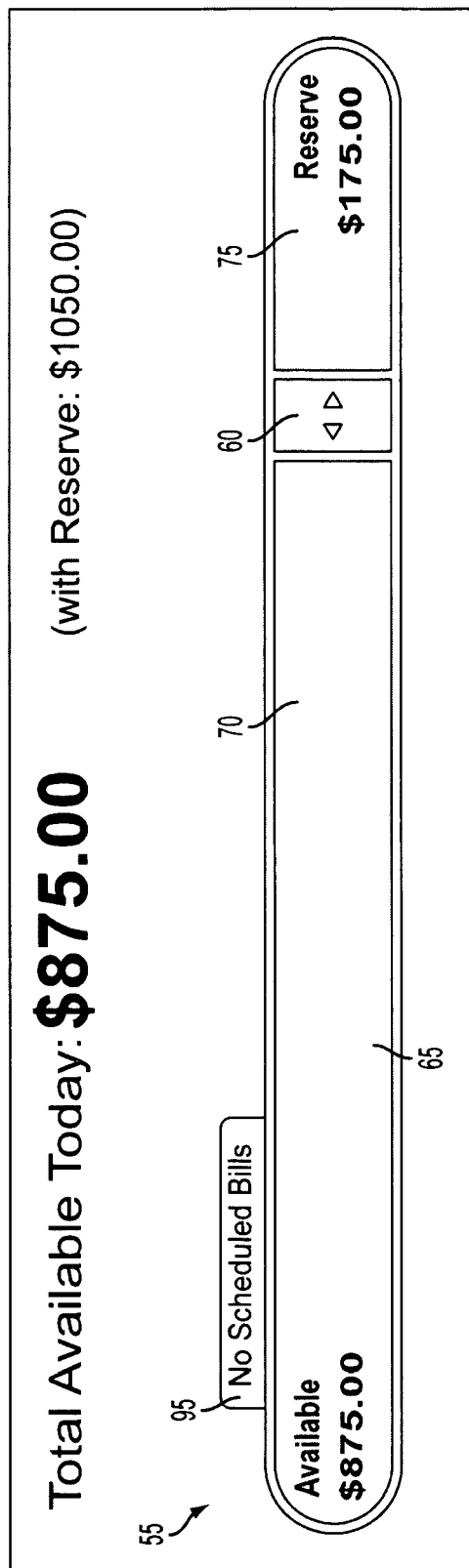
FIGS. 3A and 3B illustrate a UI screen controller according to various embodiments.
Figure 3B:
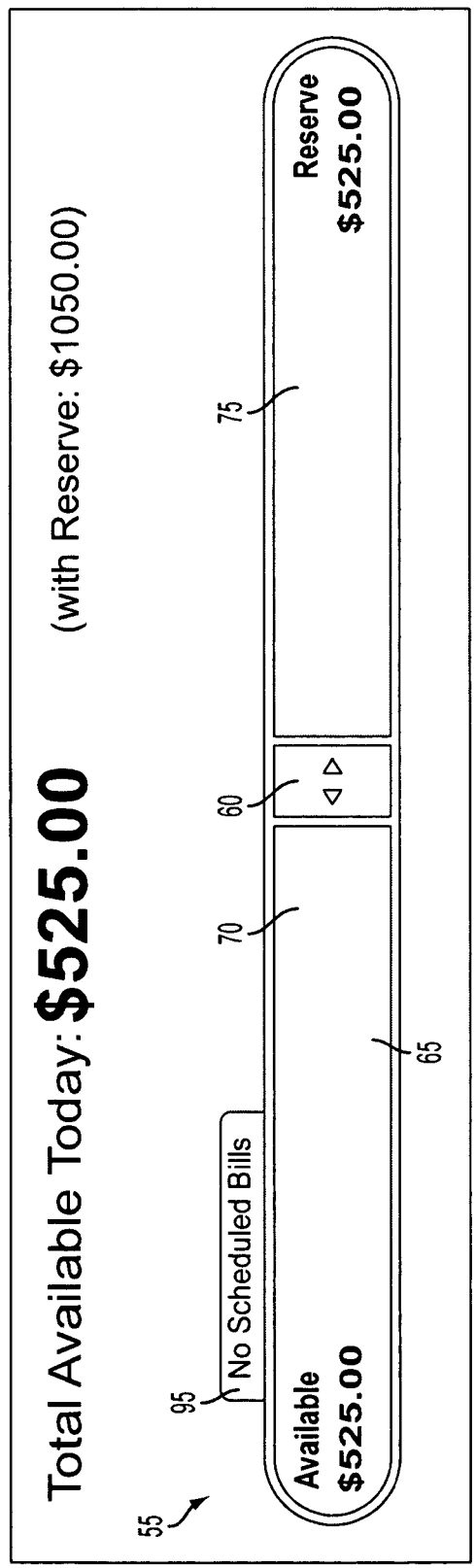

According to various embodiments and as illustrated in FIGS. 3A and 3B, the total balance represented by the available and reserve accounts may be redistributed between the accounts as desired by changing the position of the thumb element 60 on the background element 65. In FIG. 3A, for example, the thumb element 60 is positioned such that $875 of the $1,050 balance total is contained in the available account, with the remaining $175 contained in the reserve account. The length of the first segment 70 is longer than that of the second segment 75, thereby providing a graphical indication that the available account balance is larger than that of the reserve account. In FIG. 3B, the position of the thumb element 60 has been changed relative to that of FIG. 3A such that the balance of the reserve account has increased by $350 to $525. The available account has been correspondingly decreased from $875 to $525. The lengths of the first and second segments 70, 75 have decreased and increased, respectively, thus providing a graphical indication of the new balance distribution.

Figure 3C:
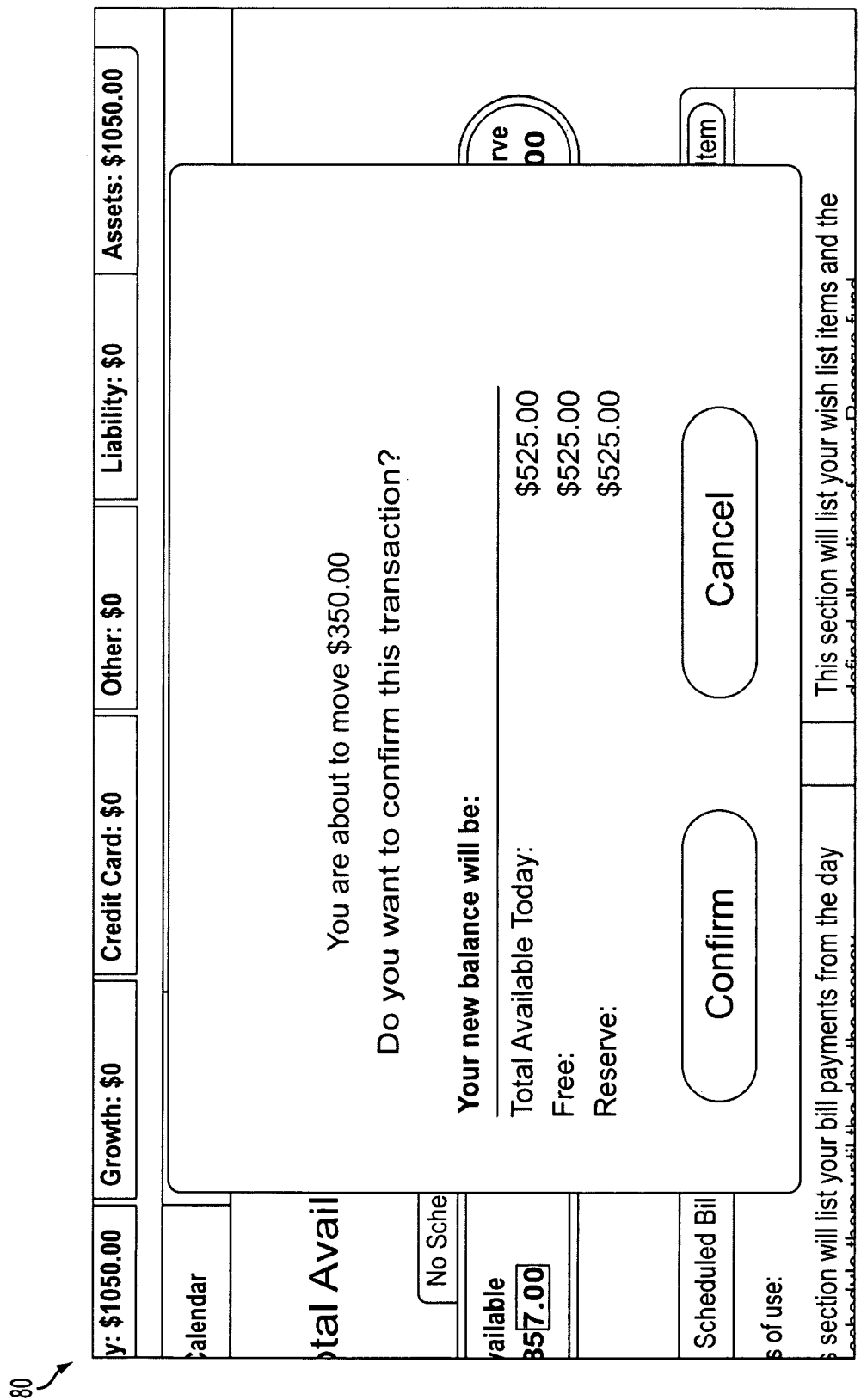
FIG. 3C illustrates a UI sub-screen according to various embodiments.

In certain embodiments, based on a change in the position of the thumb element 60, the screen 50 may cause a confirmation screen 80 (FIG. 3C) to be displayed that summarizes changes to be effected by the redistribution and requests confirmation or cancellation of the transaction by the customer. The confirmation screen 80 may indicate, for example, the amount to be redistributed and the balances of the available and reserve accounts that will result. For example, based on the positional change of the thumb element 60 described above in connection with FIGS. 3A and 3B, the confirmation screen may indicate that the redistribution amount is $350, and that the resulting balance in each of the available and reserve accounts will be $525. If user confirmation is provided, information regarding the redistribution may be communicated to the host system 7 so that the account balances may be updated accordingly. If the transaction is cancelled, no changes to the account balances will be effected, and changes to the slide controller 55 resulting from the changed position of the thumb element 60 may be cancelled.

It will thus be appreciated that position of the thumb element 60 may generally be changed in order to selectively redistribute the balance total of the available account and the reserve account between the accounts in any proportion. If necessary, for example, the thumb element 60 may be positioned such that the entire balance total is placed in either of the available or reserve accounts. In this way, the available account and the reserve account behave as a single account. It will further be appreciated that slide controller 55 may be configured to enable redistribution of the balance total in any minimum increment desired. In certain embodiments, for example, the slide controller 55 may be configured to redistribute the balance total in minimum increments of one dollar.

Embodiments of the screen 50 may include graphic and text features for communicating information regarding the customer's bill payments. Such information may be derived, for example, through the customer's enrollment in an online bill payment service offered by the banking institution. According to various embodiments, the electronic bill payments may be configured and scheduled via a bill payment screen (not shown) of the UI 42 that is accessible from the screen 50, and balances due may be paid from the available account. In certain embodiments, the host system 7 may be configured such that the reserve account provides automatic overdraft protection to the available account. In the event of an overdraft, for example, a predetermined amount may be automatically transferred from the reserve account to the available account.

In certain embodiments and with reference to FIGS. 4A-4C, bill payment information may be presented textually in one or more sub-screens provided on the screen 50. For example, a first sub-screen 85 ("scheduled out") may present information regarding bill payments that are scheduled for payment in the near-term (e.g., until the next scheduled payday or within a predetermined time period measured from the current date), and a second sub-screen 90 ("future scheduled out") may present similar information for bill payments that are scheduled for payment at later dates. Bill payment information provided by each sub-screen 85, 90 may include, for example, the billing parties and the payment due to each, the scheduled date of each payment, and the total amount scheduled to be paid.

In certain embodiments, the slide controller 55 may be configured to graphically and/or textually present aspects of the bill payment information. In one such embodiment and with reference to FIG. 4A, the slide controller 55 may include a graphic element 92 for graphically indicating the amount of funds necessary to satisfy all of the customer's near-term bill obligations (e.g., the total amount of near-term bill payments indicated by first sub-screen 85) relative to the available account balance from which the bill payment funds may be electronically withdrawn. As shown, the graphic element 92 may be a bar element 92 having a length determined by the total amount of near-term bill payments. The background element 65 may be sufficiently transparent such that placement of the bar element 92 behind the background element 65 permits the bar element 92 to be partially visible therethrough. The position of the bar element 92 behind the background element 65 may be such that the proportional lengths of the first segment 70 and the bar element 92 graphically indicate the amount of the available account balance that will be consumed by the total amount of near-term bill payments.

In certain embodiments and as shown, the bar element 92 may include a first flag element 95 formed thereon that extends beyond the top of the background element 65 and contains text indicating the total amount of near-term bill payments scheduled to be paid from the available account. In cases where no near-term bill payments are scheduled (as shown in FIG. 2A, for example), the flag element 95 may contain text indicating that no bills are scheduled. Alternatively, the flag element 95 may be hidden from view in the absence of any near-term bill payments, or if the customer has never scheduled any bill payments using the UI 42 bill payment functionality.

It should be emphasized that in cases where the bar element 92 indicates that an amount of the available account balance will be consumed by the bill payments in the near-term, the available account balance is in no way encumbered by the anticipated payments. In other words, the available account balance indicated by the slide controller 55 represents the actual amount that the customer may access at that point in time.

In certain embodiments and as further shown in FIG. 4A, the slide controller 55 may further include a second flag element 100 adjacent the top of the background element 65 and containing text indicating the amount of the available account balance in excess of the total amount of near-term bill payments. As shown, the flag element 100 may be positioned adjacent a portion of the first segment 70 that is not consumed by the bar element 92. In cases where no near-term bill payments are scheduled, or in cases where the total amount of near-term bill payments exceeds the balance of the available account, the flag element 100 may be hidden from view.

For embodiments of the slide controller 55 including a bar element 92 or other graphic element for indicating the amount of the available account balance consumed by approaching bill payments, the overall length of the slide controller 55 may be determined based on the total bill payment amount relative to the combined balances of the available account and the reserve account. For example, as shown in FIGS. 4A-4C, the combined account balances ($1,578.44) exceed the total amount of near-term bill payments ($687.14). The size of the slide controller 55 is thus determined by the overall length of the background element 65. FIG. 5 illustrates a scenario in which the combined account balances ($10) are exceeded by the total amount of near-term bill payments ($687.14). In this case, the bar element 92 exceeds the length of the background element and thus dictates the overall length of the slide controller 55. Although not shown in FIG. 5, it will be appreciated that the colors of the first and second segments 70, 75 of the background element 65 may be altered to draw attention to the fact that the approaching bill payments exceed the combined account balances.

In certain embodiments and as further shown in FIG. 5, the slide controller 55 may be configured to display the second segment 75 of the background element 65 in cases where the reserve account contains a zero balance and the available account contains a non-zero balance. In certain embodiments, where both the available account and the reserve account contain zero balances and the amount of near-term bill payments is non-zero, such as shown in FIG. 6, the thumb element 60 may be hidden from view and the background element 65 uniformly colored (e.g., red) to indicate that the amount of near-term bill payments exceeds the combined account balances.

The slide controller 55 may be configured to provide a graphical indication of a pending deposit into the available account and a text caption indicating the amount of the pending deposit. In certain embodiments and as shown in FIG. 7, for example, a pending deposit may be indicated by the presence of an asterisk 102 or other suitable symbol superimposed on the first segment 70 of the background element 65. The amount of the pending deposit may not be included in the available account balance until the deposit is approved by the banking institution. Conversely, charges pending against the available account may be reflected in the available account balance.

In certain embodiments, the screen 50 may further include graphic and text features for allocating portions of the reserve account balance towards purchases anticipated in the future. With reference to FIG. 2B, for example, the screen 50 may include a sub-screen 105 ("reserve") listing the anticipated purchases, corresponding purchase prices, and an amount of the reserve account balance currently allocated to each purchase. This information may be editable by the customer, and additional purchases may be added to the sub-screen 105 as desired. The screen 50 may further indicate an amount of the reserve account that is currently unallocated, and the total balance of the reserve account. In certain embodiments, the amount allocated to each purchase may be manually input into the corresponding field of the sub-screen 105 by the customer. Alternatively, the allocated amount may be increased in accordance with savings rules (e.g., event-based or periodic spending rules) configured by the customer via a separate UI screen (not shown) linked to the screen 50. Withdrawals from the reserve account (e.g., withdrawals resulting from the redistribution of funds from the reserve account to the available account) may initially be taken out of the unallocated portion of the reserve account balance, and the allocated amounts will only be depleted when the unallocated amount is zero.

FIGS. 8A-8B illustrate a screen 110 of the UI 42 that may be displayed as an alternative to the screen 50 described above. The screen 110 may be implemented, for example, as a dynamic HTML Web page hosted by the Web server 10 that is accessible by the client 40 subsequent to customer authentication. In certain embodiments and as shown, the screen 110 may be one of a plurality of linked screens that collectively define the UI 42. As with the screen 50, the screen 110 may include various graphic and text features designed to efficiently communicate information regarding aspects of the customer's finances. However, features of the screen 110 may take into account spending habits and unique banking needs of younger demographics, such as high school and college-aged customers, for example.

As shown in FIG. 8A, the screen 110 may include an expandable information graphic 115 for displaying aspects of the customer's finances. According to various embodiments, the information graphic 115 may be configured to graphically integrate and display information pertaining to a first account and a second account associated with the customer. As described above in connection with the slide controller 55, for example, the first account may be a transactional, or "available," account for providing accessibility to funds on demand using, for example, a check or an electronic funds transfer, and the second account may be a savings, or "reserve," account. The information graphic 115 may comprise a first segment 120 and a second segment 125 for displaying information pertaining to the available and reserve accounts, respectively. FIG. 8A illustrates the information graphic 115 in a collapsed state in which a length of the second segment 125 corresponding to the reserve account is predominately "hidden" behind the first segment 120 corresponding to the available account. Accordingly, in its collapsed state, the information graphic 115 may primarily convey information pertaining to the available account (e.g., a balance of the available account).

Figure 9A:
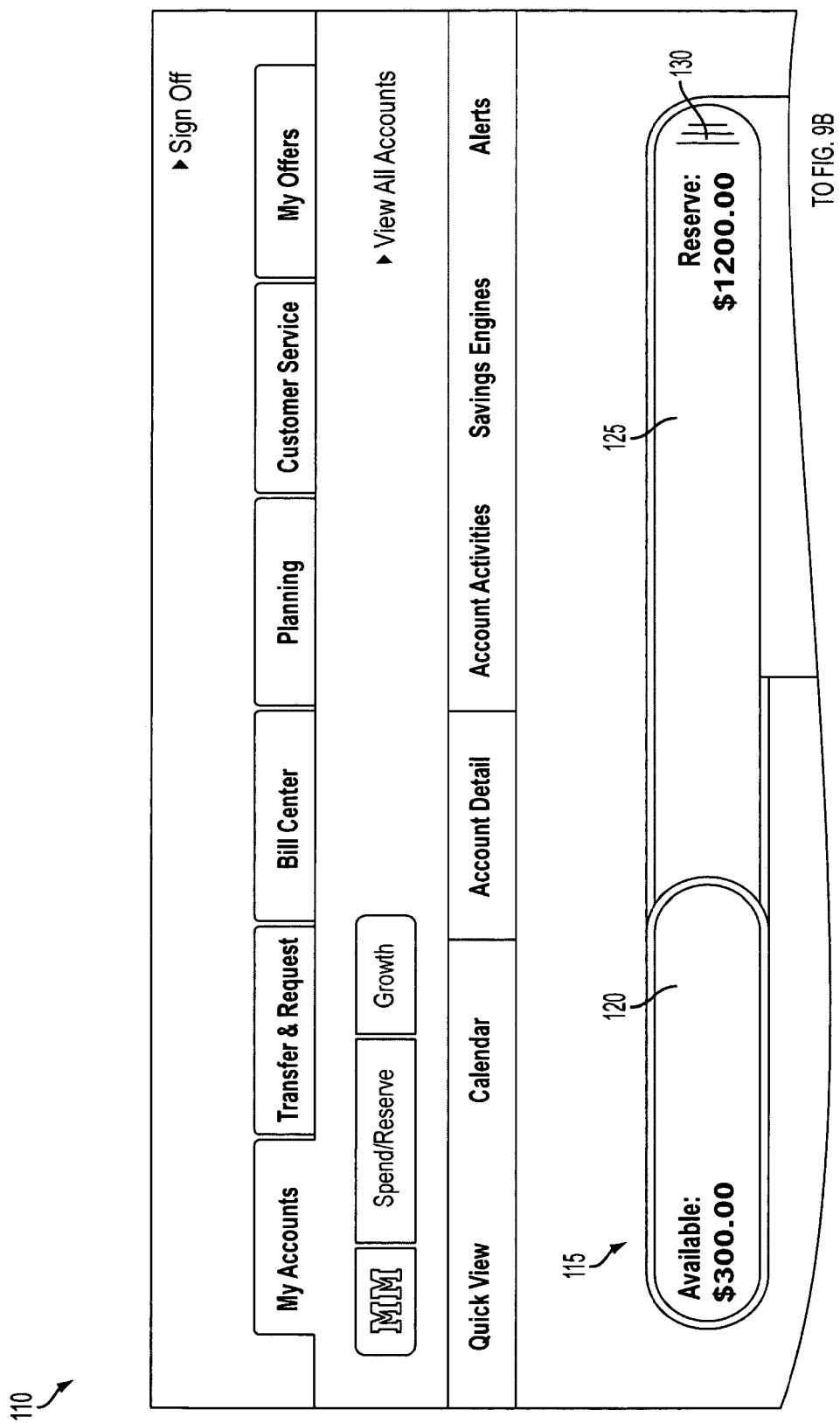

FIGS. 9A-9B illustrate the information graphic 115 in an expanded state in which the hidden portion of the second segment 125 has been unhidden by a corresponding reduction in the length of the first segment 120. Transitioning between the collapsed and expanded states of the information graphic 115 may be effected, for example, by clicking on, dragging, or otherwise selecting a tab portion 130 of the second segment 125. Accordingly, in its expanded state, the information graphic 115 may convey information pertaining to both the available account and reserve account (e.g., a balance of each account). In certain embodiments, when the information graphic 115 is expanded, the relative lengths of the first and second segments 120, 125 may be representative of the relative balances contained in the available and reserve accounts, respectively. As shown in FIG. 9A, for example, the balance of the reserve account ($1,200) is larger than that of the available account ($300). Accordingly, the length of the second segment 125 is depicted as being greater than that of the first segment 120. In certain embodiments, the relative lengths of the first and second segments 120, 125 may be proportional to the balances of the available and reserve accounts, respectively. For example, if the balance of the available account represents one quarter of the combined account balances, the length of the first segment 120 may only be one quarter of the length of the second segment 125.

It will be appreciated the information graphic 115 of FIGS. 8A-B and 9A-B, as well as the slide controller 55 of FIG. 2A, are not limited to the use of segment-shaped graphic elements to display or represent account information, and that graphic elements of any geometrical type or shape may generally be used to display such information. Suitable graphic elements may include, for example, any type of bounded shape (e.g., a polygon shape, such as a quadrilateral, a curved shape, such as a circle, circular sector, ellipse, or oval), line segment (e.g., a straight line segment, a curved line segment), or a shape comprising a bounded shape(s) and a line segment(s). In certain embodiments, the graphic elements used to display or represent account information may be the substantially identical geometrical types or shapes (such as first and segments 70, 75 of slide controller 55 and the first and second segments 120, 125 of the information graphic 115), although it will be appreciated that different shapes may be used for each graphic element.

It will similarly be appreciated that the particular orientations of the graphic elements presented herein are provided by way of example only, and that any suitable orientation may generally be used. For example, while graphic elements of the slide controller 55 and the information graphic 115 are shown in horizontal orientations relative to a display screen by way of example, in certain embodiments the graphic elements may instead be arranged in a vertical orientation relative to a display screen, or in an orientation that is neither horizontal nor vertical relative to a display screen. The use of particular dimension of a graphic element to represent account information may depend on the particular orientation of the graphic element. For example, for the slide controller 55 and the information graphic 115, the lengths of the first and segments 70, 75 are used to represent account information due to the horizontal orientation of the first and segments 70, 75 relative to the display screen 50. In embodiments in which graphic elements are oriented vertically, the heights of the graphic elements may be used to represent account information. In certain embodiments, a graphic element may be oriented to provide a perspective view, in which case a width of the graphic element may be used to represent account information.

Figure 14A:
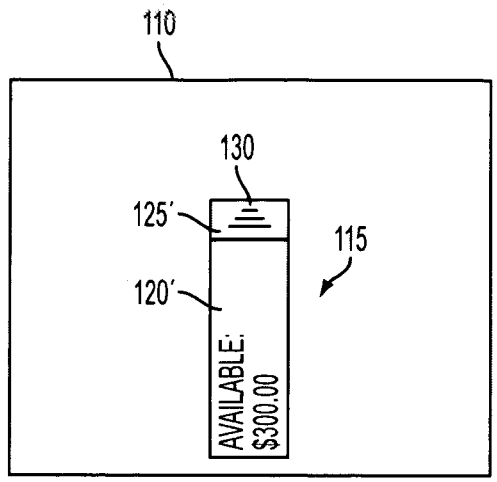
FIGS. 14A-14F illustrate information graphics according to various embodiments.
Figure 14B:
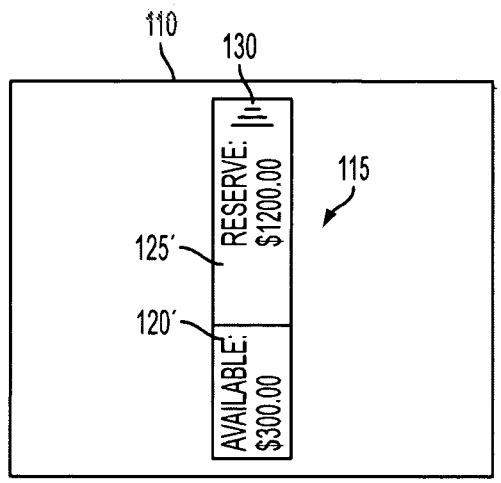

FIGS. 14A and 14B illustrate an embodiment of the information graphic 115 in which the graphic elements 120', 125' comprise polygon shapes arranged in vertical orientation relative to the display screen 110. In FIG. 14A, only information pertaining to the available account is displayed by the graphic element 120'. FIG. 14B illustrates the information graphic 115 subsequent to selection of the tab portion 130. As shown, information for both the available and reserve accounts is now displayed by graphic elements 120', 125', respectively.

Figure 14C:
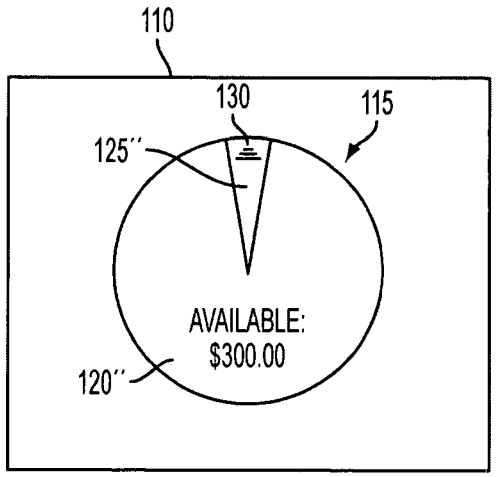
Figure 14D:
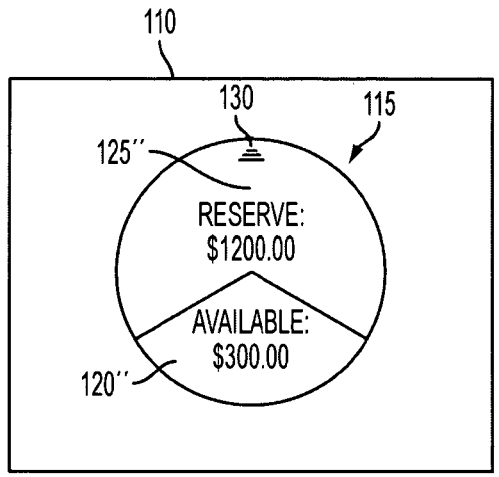

FIGS. 14C and 14D illustrate another embodiment of the information graphic 115 in which graphic elements 120", 125" comprise circular sectors. In FIG. 14C, only the information pertaining to the available account is displayed by the graphic element 120". In FIG. 14D, information for both the available and reserve accounts is displayed by graphic elements 120", 125", respectively, subsequent to selection of the tab portion 130.

Figure 14E:
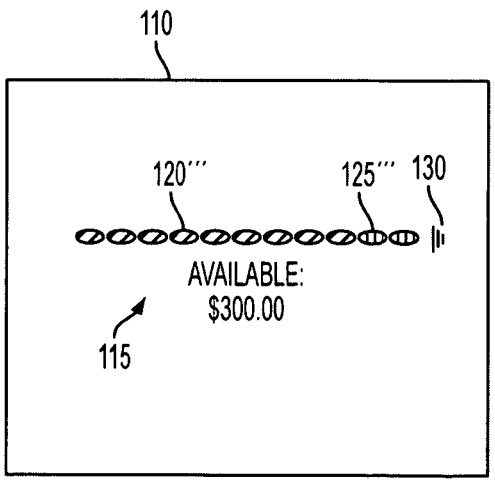
Figure 14F:
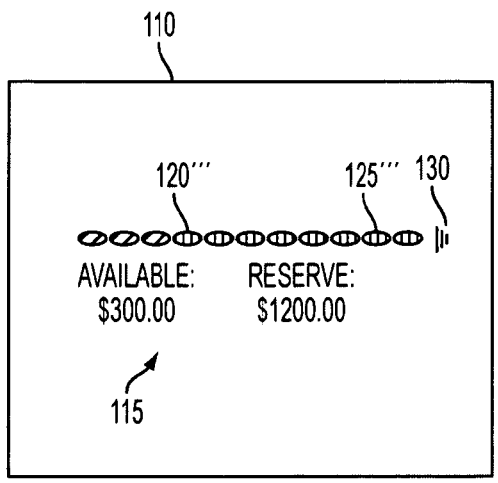

It will additionally be appreciated that the graphic elements need not comprise a single, continuous geometrical shape. In certain embodiments and as shown in FIGS. 14E and 14F, for example, each graphic element 120''', 125''' may instead comprise a number of discrete geometrical shapes. The color and/or shape of the geometrical shapes of each graphic element 120''', 125''' may be uniform but different than that other graphic element to enhance viewing ease. In FIG. 14E, only the information pertaining to the available account is displayed by the graphic element 120'''. In FIG. 14F, information for both the available and reserve accounts is displayed by graphic elements 120''', 125''', respectively, subsequent to-selection of the tab portion 130.

Referring again to FIG. 9A, in certain embodiments, the information graphic 115 may lack a slidable element (such as thumb element 60 of slide controller 55, for example) for redistributing the total balance represented by the available and reserve accounts between the accounts. Transfers between the available and reserve accounts, as well as transfers involving other accounts (e.g., other accounts internal and/or external to the banking institution) may instead be performed via a sub-screen of the information graphic 115, such as the transfer subscreen 135 of FIG. 9B. As shown, the transfer sub-screen 135 may comprise a "transfer type" drop down box 140 for selecting a particular type of transfer, a "from" drop down box 145 for selecting a source of transferred funds, a "to" drop down box 150 for selecting a destination of transferred funds, an "amount" text field 155 for entering an amount of funds to be transferred, and a "go" button 160 for effecting the transfer after the transfer type, fund source, fund destination and transfer amount have been specified.

Figure 10A:
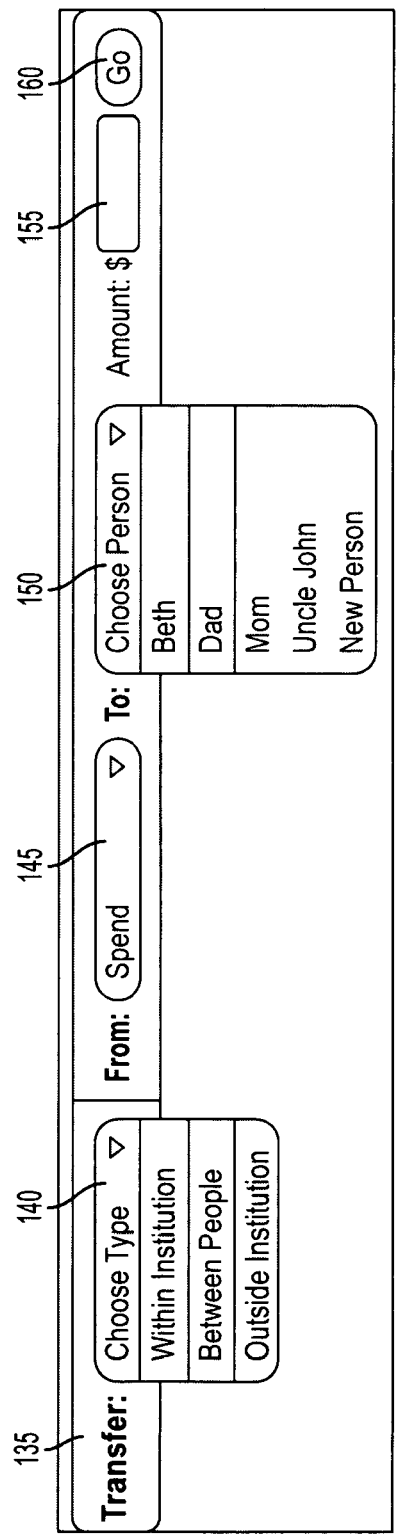
FIGS. 10A-10C illustrate a UI fund transfer sub-screen according to various embodiments.

Types of fund transfers selectable via the transfer type drop down box 140 are illustrated in FIG. 10A, according to one embodiment, and may include a "within financial institution" transfer, a "between people" transfer and an "outside financial institution" transfer. As shown in FIG. 10A, the "between people" transfer has been selected. This transfer type may be used to enable the transfer of funds from an account of the customer, as selected via the "from" drop down box 145, to an account of another person or entity, as selected via the "to" drop down box 150. The configuration of the transfer sub-screen 135 may be such that selection of a particular transfer type causes the "from" drop down box 140 and the "to" drop down box 150 to be populated with eligible sources and destinations for transferred funds, respectively. In certain embodiments, for example, the "from" drop down box 145 may be populated with one or more existing accounts that the customer has opened with the banking institution (e.g., the available and reserve accounts, a money market account), and the "to" drop down box 150 may be populated with names of persons or entities previously designated by the customer as being eligible to receive fund transfers from the customer. In certain embodiments, the identity of each person or entity listed in the "to" drop down box 150, as well as their account information and other information (e.g., e-mail address(es), telephone number(s)), may be added by the customer via a sub-screen (not shown) that is displayable, for example, by selecting a "new person" option contained within the "to" drop down box 150. In one embodiment, one or more persons or entities listed in the "to" drop down box 150 may be account holders at the banking institution, in which case transfers may be conducted entirely from within system 5 of the banking institution. In other embodiments, one or more persons or entities listed in the "to" drop down box 150 may be account holders at one or more other institutions, in which case the system 5 of the banking institution may communicate with similar systems of the other banking institution(s) to effect transfers.

In certain embodiments, the particular customer account(s) from which funds are eligible to be transferred may be specified by the customer. For example, the customer may specify that funds are only eligible to be transferred from the available account and from a money market account, and that transfers from the reserve account are prohibited. Such restrictions may be specified by the customer via a sub-screen (not shown) of the screen 110, or by the banking institution at the customer's request, for example. Additionally, population of the "to" drop down box 150 with persons or entities eligible to receive transferred funds may be based upon the particular customer account selected via the "from" drop down box 145. For example, a customer may have an account with the banking institution associated with a home business of the customer, in which case the "to" drop down box may only be populated with persons or entities eligible to receive transfers from the business account (e.g., suppliers and vendors associated with the home business) when the business account is selected at the source of the fund transfer. In this way, inadvertent transfers between accounts may be avoided. Such transfer restrictions may be specified on a person-by-person basis when the identities of persons or other entities eligible to receive transfers are supplied by the user (e.g., using a "new person" option contained within the "to" drop down box 150.

In certain embodiments, when a "between people" transfer has been selected, selection of the button 60 to initiate the transfer may cause an e-mail sub-screen 165 (FIG. 11) to be displayed. In this way, the customer may transmit an e-mail message to the intended recipient to indicate that a transfer is forthcoming. The e-mail sub-screen 165 may be displayed by an e-mail utility of the UI 42, or by a separate e-mail program hosted by the client 40, and may comprise elements of a conventional e-mail interface, such as, for example, a "to" field for specifying an e-mail address of the intended recipient, a "subject" field, and a field for entering the e-mail text. Additionally, the e-mail sub-screen 165 may comprise an "item" field for indicating the transfer amount and a reason why the transfer is being made. In certain embodiments, the e-mail address of the intended recipient may be automatically entered based on an e-mail address previously associated with the intended recipient by the customer (e.g., using a sub-screen associated with the "new person" option contained within the "to" drop down box 150). Similarly, the amount of the transfer may be automatically indicated based on the transfer amount entered into the "amount" text field 155. In certain embodiments, the e-mail sub-screen 165 may include an option for sending the e-mail to a mobile device (e.g., a cell phone) associated with the intended recipient. The e-mail sub-screen 165 may further include "send" and "cancel" buttons for transmitting or discarding the e-mail message, respectively. Selection of the send button may also consummate the fund transfer, and selection of either the send or cancel buttons may also cause the e-mail sub-screen 165 to be closed such that the customer is returned to the transfer sub-screen 135.

Figure 10B:
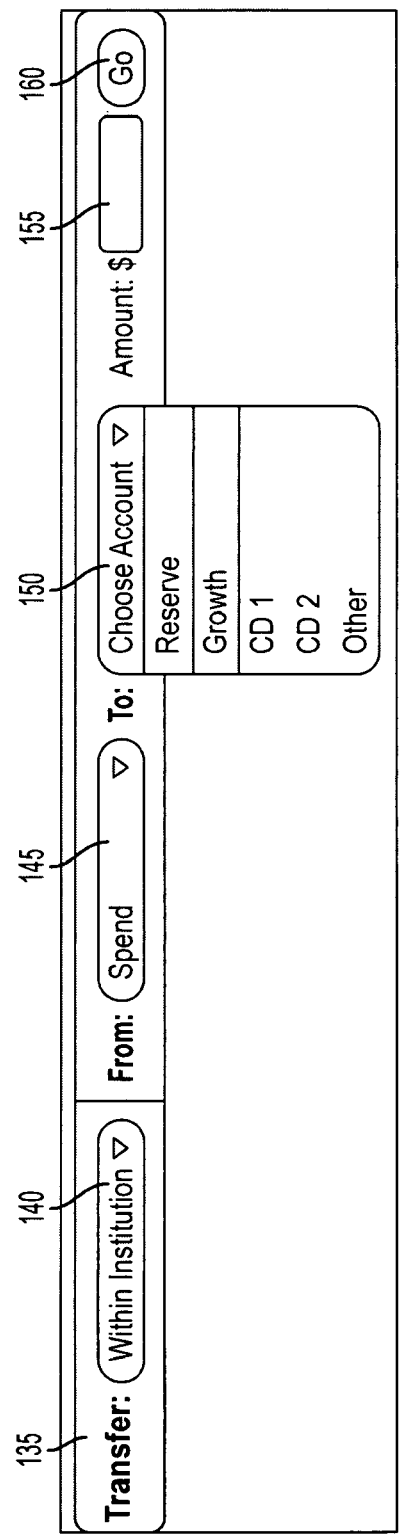

As shown in FIG. 10B, the "within financial institution" transfer has been selected. This transfer type may be used to enable the transfer of funds between the customer's accounts within the banking institution. In certain embodiments, for example, each of the "from" drop down box 145 and the "to" drop down box 150 may be populated with one or more existing accounts that the customer has opened with the banking institution (e.g., the available and reserve accounts). In a manner similar to that described above in connection with the "between people" transfer type, a customer may restrict accounts to and from which transfers may be made using the "within banking institution" transfer type. For example, the customer may restrict transfers between his business and personal accounts. Such restrictions may be specified by the customer via a sub-screen (not shown) of the screen 110, or by the banking institution at the customer's request, for example.

Figure 10C:
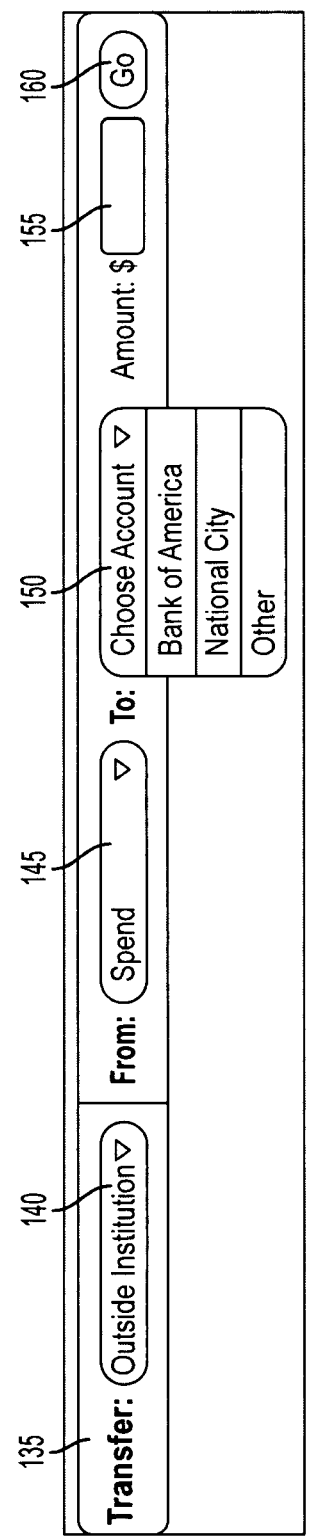

As shown in FIG. 10C, the "outside financial institution" transfer has been selected. This transfer type may be used to enable the transfer of funds from a customer's account within the banking institution to one or more customer accounts at one or more other banking institutions. In certain embodiments, for example, the "from" drop down box 145 may be populated with one or more existing accounts that the customer has opened with the banking institution (e.g., the available and reserve accounts, a money market account), and the "to" drop down box 150 may be populated with accounts of the customer at other banking institutions previously designated by the customer as being eligible to receive funds from the customer's accounts at the banking institution. In certain embodiments, the account names listed in the "to" drop down box 150, as well as any account information necessary to effect transfers, may be added by the customer via a sub-screen (not shown) that is displayable, for example, by selecting an "other" option contained within the "to" drop down box 150. In a manner similar that described above in connection with the "between people" transfer type, a customer may restrict accounts to and from which transfers may be made using the "outside banking institution" transfer type. For example, the customer may restrict transfers between business and personal accounts. Such restrictions may be specified by the customer via a sub-screen (not shown) of the screen 110, or by the banking institution at the customer's request, for example.

After the appropriate transfer type, fund source, fund destination, and transfer amount have been specified by the customer, the button 160 may be selected to effect the transfer. In one embodiment, the transfer may be effected immediately upon selection of the button 160. In another embodiment, selection of the button 160 may cause a confirmation screen (not shown) similar to that shown in FIG. 3C to appear such that the customer may confirm or cancel the transfer. In certain embodiments, the transfer sub-screen 135 may be configured to retain the drop down box selections and the transfer amount of the previous transfer operation until during a subsequent transfer.

In certain embodiments, the screen 110 may comprise one or more bill payment subscreens 170 similar or identical to sub-screen 85 of the screen 50 for textually presenting bill payment information. As discussed above in connection with the screen 50, such information may be derived, for example, through the customer's enrollment in an online bill payment service offered by the banking institution. The electronic bill payments may be configured and scheduled, for example, via a bill payment screen (not shown) of the UI 42 that is accessible from the bill payment sub-screen 170 (via an "add" button, for example) and balances due may be paid from the available account. Bill payment information displayed by the screen 110 may include, for example, the billing parties, and the payment due to each, the scheduled date of each payment, and the total amount scheduled to be paid. In certain embodiments, if there are no bills scheduled to be paid (as shown in FIGS. 8A-8B, for example), the sub-screen 170 may display a prompt introducing the bill payment functionality. In certain embodiments, the host system 7 may be configured such that the reserve account provides automatic overdraft protection to the available account. In the event of an overdraft, for example, a predetermined amount may be automatically transferred from the reserve account to the available account. In certain embodiments, the occurrence of an overdraft may automatically cause an alert to be sent to the customer (e.g., to an e-mail utility of the UI 42, to an e-mail program hosted by the client 40, to a telephone associated with the user) using customer contact information on record with the banking institution or contact information previously entered by the customer via a sub-screen of the UI 42.

In certain embodiments, the information graphic 115 may be configured to graphically and/or textually present aspects of the bill payment information in a manner similar to that discussed above in connection with the slide controller 55. In one such embodiment, for example, and with reference to FIG. 12A, the information graphic 115 may include a bar element 92 for graphically indicating the amount of funds necessary to satisfy all of the customer's near term bill obligations (e.g., the total amount of near-term bill payments indicated by the sub-screen 170) relative to the available account balance from which the bill payment funds may be electronically withdrawn. The position of the bar element 92 may be such that the proportional lengths of the first segment 120 and the bar element 92 graphically indicate the amount of the available account balance that will be consumed by the total amount of near-term bill payments. The bar element 92 may also include a first flag element 95 containing text indicating the total amount of near-term bill payments scheduled to be paid from the available account. In cases where no near-term bill payments are scheduled (as shown in FIG. 12B, for example), the flag element 95 may contain text indicating that no bills are scheduled. Alternatively, the flag element 95 may be hidden from view in the absence of any near-term bill payments.

In cases where the information graphic 115 indicates that an amount of the available account balance will be consumed by the bill payments in the near-term, the available account balance is in no way encumbered by the anticipated payments. In other words, the available account balance indicated by the information graphic 115 represents the actual amount that the customer may access at that point in time.

Figure 12A:
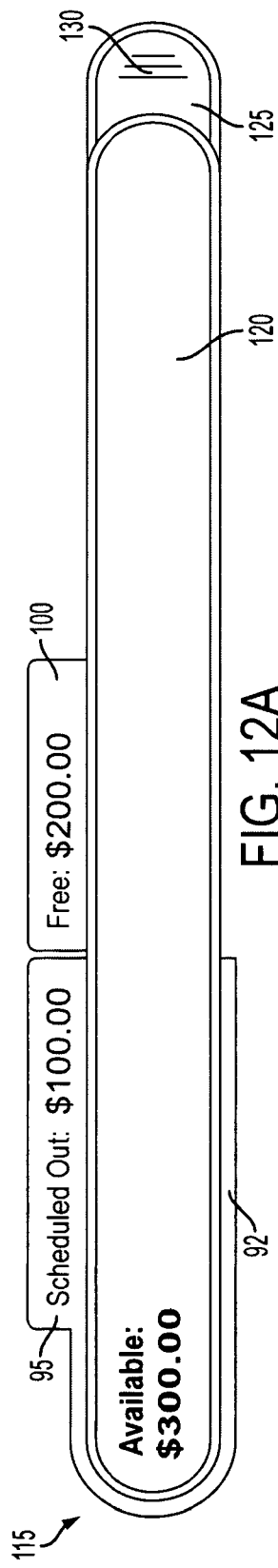
FIGS. 12A-12E illustrate configurations of the UI screen information graphic of FIGS. 8A-B and 9A-B according to various embodiments.
Figure 12B:
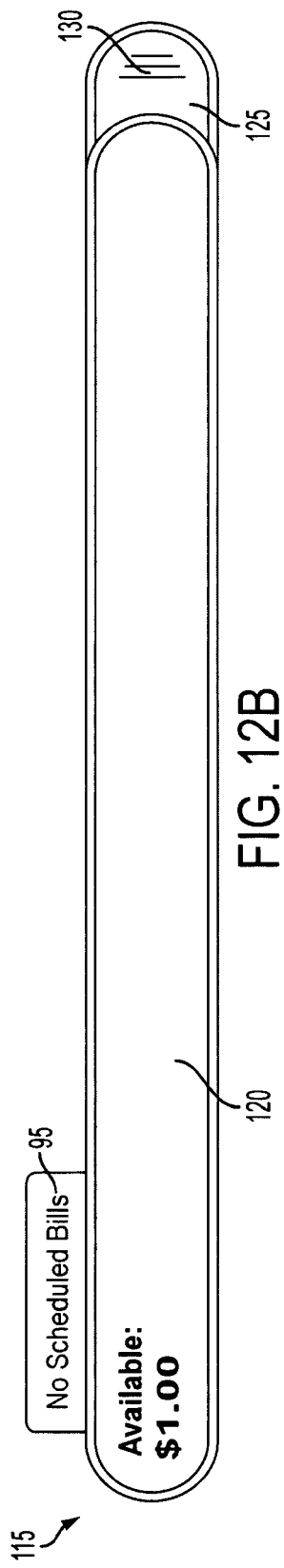

As further shown in FIG. 12A, the information graphic 115 may further include a second flag element 100 containing text indicating the amount of the available account balance in excess of the total amount of near-term bill payments. As shown, the flag element 100 may be positioned adjacent a portion of the first segment 120 that is not consumed by the bar element 92. In cases where no near-term bill payments are scheduled, or in cases where the total amount of near-term bill payments exceeds the balance of the available account, the flag element 100 may be hidden from view.

Figure 12C:
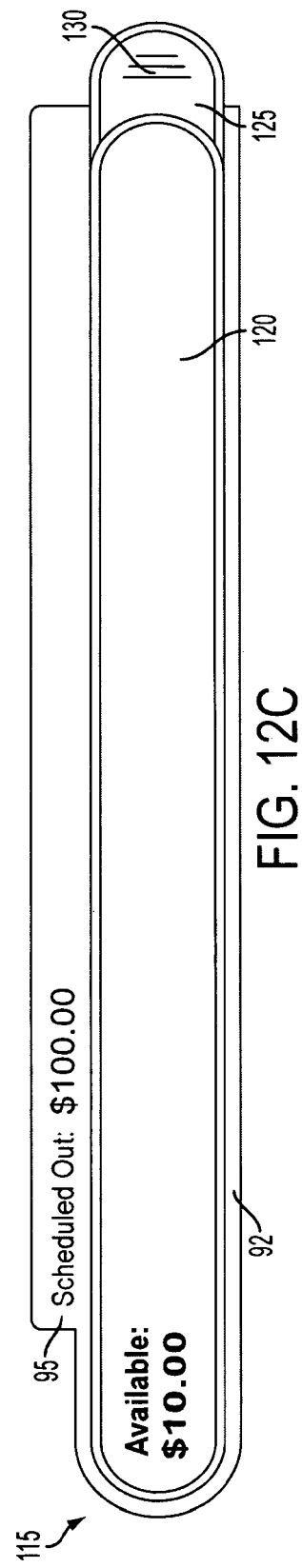
Figure 12D:
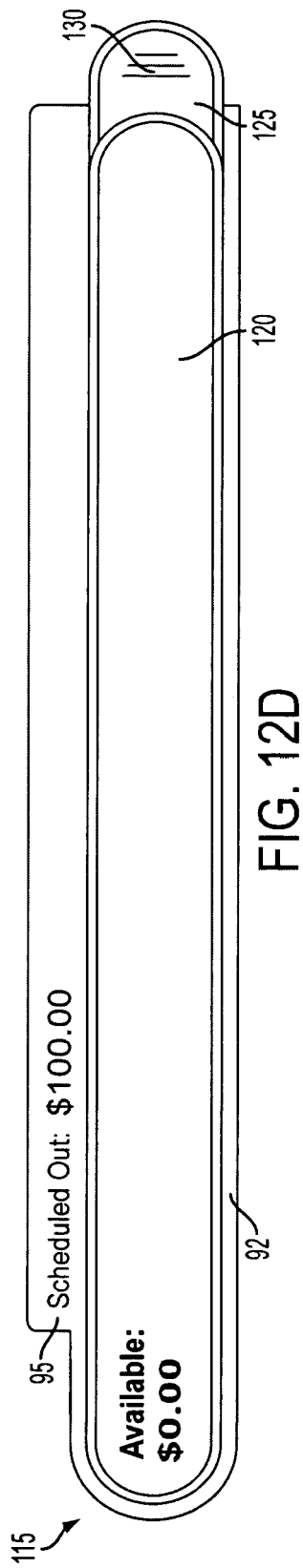

FIGS. 12C and 12D illustrate other operational configurations of the information graphic 115 according to various embodiments. In FIG. 12C, the total amount of near-term bill payments exceeds the available account balance. Accordingly, the length of the bar element 92 exceeds the length of the first segment 120, and the second flag element 100 that may otherwise indicate the amount of the available account balance is hidden. In FIG. 12D, the total amount of near-term bill payments exceeds the total of the available and reserve account balances, indicating a "bankrupt" scenario. In such cases, the color of the first segment 120 may be altered to draw attention to the fact that the approaching bill payments exceed the combined available reserve and account balances.

Figure 12E:
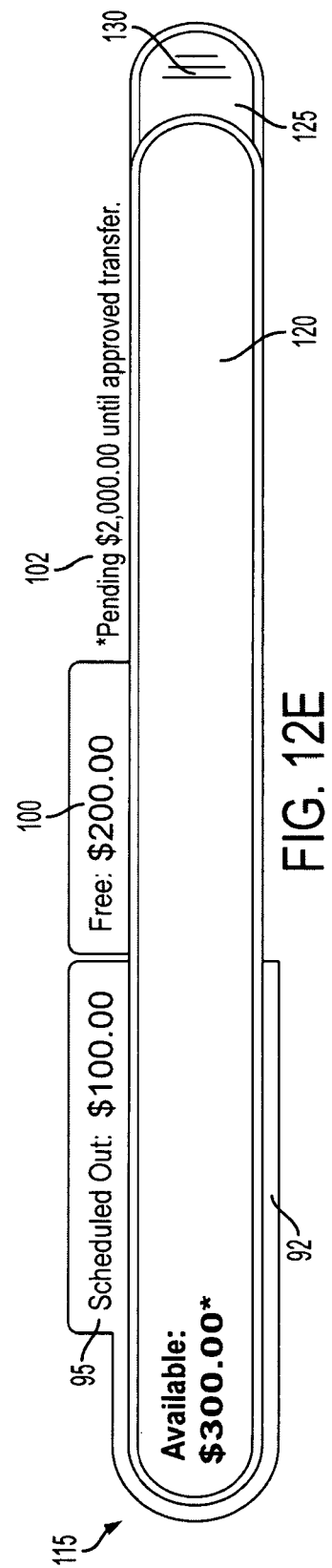

As shown in FIG. 12E, the information graphic 115 may be configured to provide a graphical indication of a pending deposit into the available account and a text caption indicating the amount of the pending deposit. For example, a pending deposit may be indicated by the presence of an asterisk 102 or other suitable symbol adjacent the first segment 120. The amount of the pending deposit may not be included in the available account balance until the deposit is approved by the banking institution. Conversely, charges pending against the available account may be reflected in the available account balance.

According to various embodiments and with reference to FIGS. 9A-98, transitioning the information graphic 115 from the collapsed state to an expanded state may cause the display of a sub-screen 175 listing anticipated purchases or other spending events and an amount of the reserve account allocated to each. In certain embodiments, the sub-screen 175 may be visible only when the information graphic 115 is in the expanded state. A date associated with each spending event may also be displayed, along with an "edit" button to enable editing of information pertaining to a corresponding spending event. The sub-screen 175 may also display the total amount of the reserve account currently allocated toward spending events, and an amount of interest earned on the reserve account.

FIG. 13A illustrates a configuration of the sub-screen 175 resulting from selection of an edit button corresponding to a particular spending event. As shown, the description of the spending event, the date associated with the spending event, and the amount allocated toward the event may be contained in corresponding text fields editable to receive the appropriate information. Additionally, when in the editing mode, the sub-screen 175 may display a reminder date field for specifying a reminder date relative to the event date (e.g., on the day of the event, one day ahead, one week ahead). In other embodiments, the reminder date field may permit text entry of a particular date. In certain embodiments, the reminder may be provided via an e-mail utility of the UI 42, or by an e-mail program hosted by the client 40, for example. In other embodiments, the reminder may be provided to a telephone associated with the customer using customer contact information on record with the banking institution or contact information previously entered by the customer via a sub-screen of the UI 42. The sub-screen 175 may further display "save" and "delete" buttons for each edited spending event so that edits to the event information may be saved or discarded. Selection of either the save or delete button may also cause the sub-screen 175 to exit the editing mode and return to a display mode, such as shown in FIGS. 9A-9B.

As shown in FIGS. 9A-9B, the sub-screen 175 may further comprise an "add" button for adding a spending event to the sub-screen 175. Selection of the add button may cause the display of a sub-screen 180 (FIG. 13B) containing editable text fields for entering a description of the spending event, a date associated with the spending event, a reminder date based on the event date, and an amount allocated toward the event. The sub-screen 180 may further display "save" and "delete" buttons for saving or discarding the entered information. Selection of either the save or delete button may also cause the sub-screen 180 to close and return the customer to the sub-screen 175. In certain embodiments, where a date has been associated with the event, selecting the save button may further provide a calendar-based indication, or other indication on one or more separate UI screens, identifying the spending event based on the event date. In certain embodiments, if no spending events have been added to the sub-screen 175, the subscreen may display "tips of use" information to the customer.

In certain embodiments, when funds are transferred from the reserve account (e.g., an automatic transfer by the banking institution if the available account becomes overdrawn), the funds may be transferred from the reserve account in the following order: from unallocated funds to the reserve account, from spending events of the sub-screen 175 not having an associated date, and then from spending events of the sub-screen 175 having associated dates, beginning with the dates furthest in the future.

The screen 110 and its features may be more ideally suited for customers within younger demographic groups, such as high school and college-aged customers, for example. A key behavior of such groups is hiding, or "stashing" money for specific items and events, for example. The functionality of the information graphic 115 reflects this behavior by permitting allocation of the reserve account balance toward anticipated spending events when the information graphic 115 is expanded state, and concealing the allocations from view when information graphic 115 is collapsed. Additionally, the ability to flexibly transfer funds between account holders (particularly joint account holders) is important to younger customers. The functionality of the transfer sub-screen 135 caters to this need by enabling the transfer of funds not only between the available and reserve accounts, but also between other customer accounts within or external to the banking institution, and between customer accounts and accounts associated with other persons.

Although embodiments described above may access the UI screen 50 via a network enabled client 40, it will be appreciated that the UI screens 50, 110 may be accessible using other devices and communication channels. In certain embodiments, for example, the UI screens 50, 110 or features thereon may be accessible to customers via an automated teller machine (ATM) in communication with the application server 15 via a communication network. In such embodiments, graphical and textual aspects of the screen 50 may be adapted to conform to the particular hardware and software requirements of the ATM.

An information graphic displayable via an electronic UI to integrate information from accounts held at a financial institution is disclosed hereinabove. In one embodiment, the information graphic includes a first graphic element to display first information associated with at least one first account and a second graphic element to display second information associated with at least one second account. A dimension of the first graphic element is representative of the first information and a dimension of the second graphic element is representative of the second information. A first portion of the second graphic element is selectable to alternately virtually hide and display a second portion of the second graphic element.

In another embodiment, the information graphic includes a first graphic element to display at least a portion of first information associated with at least one first account and a second graphic element to display at least a portion of second information associated with at least one second account. A ratio of a dimension of the first graphic element to a dimension of the second graphic element is substantially equal to a ratio of a balance contained in the at least one first account to a balance contained in the at least one second account. The second graphic element includes a first portion selectable to alternately virtually hide and display a second portion of the second graphic element.

A UI displayable via an electronic device is also disclosed hereinabove. The UI includes an information graphic to display first information associated with at least one first account and second information associated with at least one second account. The at least one first account and the at least one second account are held by a financial institution. The information graphic includes a first graphic element and a second graphic element adjacent the first graphic element. The second graphic element includes a selectable portion to alternately transition the information graphic between a first display state and a second display state. In one embodiment, the selectable portion of the second graphic element is responsive to clicking and/or dragging the selectable portion with a pointing device, such as a computer mouse. A first dimension of the first graphic element and a first dimension of the second graphic element are displayed when the information graphic is in the first display state. The first graphic element is to display the first information in the first display state, and the first dimension of the second graphic element is to display the selectable portion in the first display state. The first dimension of the second graphic element is increased to a second dimension when the selectable portion of the second graphic element is selected during the first display state. The second dimension of the second graphic element corresponds to the second display state. The first graphic element is to display the first information in the second display state, and the second dimension of the second graphic element is to display the second information and the selectable portion in the second display state. The second dimension of the second graphic element is decreased to the first dimension when the selectable portion of the second graphic element is selected during the second display state.

In one embodiment, a shape of the first and second graphic elements includes a bounded shape or a line segment. The first and second graphic elements can be substantially identical in shape. The first dimension of the first graphic element, and the first and second dimensions of the second graphic element, can be any of length, width and height.

In one embodiment, when the selectable portion of the second graphic element is selected during the first display state, the first dimension of the first graphic element is decreased by an amount equal to the increase in the dimension of the second graphic element such that the combined dimensions of the first and second graphic elements does not change during a transition from the first display state to the second display state. In another embodiment, when the selectable portion of the second graphic element is selected during the first display state, the first dimension of the first graphic element remains constant such that the combined dimensions of the first and second graphic elements changes during a transition from the first display state to the second display state.

In one embodiment, the first information associated with the at least one first account includes a balance of the at least one first account, and the second information associated with the at least one second account includes a balance of the at least one second account. The at least one first account can include a demand account, and the at least one second account can include a savings account.

In one embodiment, during the second display state, relative dimensions of the first and second graphic elements are indicative of relative balances of the at least one first account and the at least one second account, respectively. The relative dimensions of the first and second graphic elements can be in proportion to relative balances of the at least one first account and the at least one second account, respectively.

In one embodiment, the first graphic element includes text to indicate at least a portion of the first information, and the second dimension of the second graphic element includes text to indicate at least a portion of the second information.

In one embodiment, the UI includes a transfer screen to effect a transfer between accounts. The transfer screen includes a first input field to receive first input indicating a type of the transfer, a second input field to receive second input indicating a source of the transfer, a third input field to receive third input indicating a destination of the transfer, and a fourth input field to receive fourth input indicating an amount of the transfer. According to various embodiments, eligible values of at least one of the second and third inputs are determined based on a value of the first input, and eligible values of the third input are determined based on a value of at least one of the first and second inputs. In one embodiment, the type of transfer can be (1) a transfer between accounts associated with a customer of the financial institution in which at least one of the accounts associated with the customer held by the financial institution, or (2) a transfer between an account associated with the customer of the financial institution and held by the financial institution and an account of a person or entity different than the customer. The first type of transfer can be a transfer from an account held by the financial institution and associated with the customer to an account held by another financial institution that is associated with the customer. The second type of transfer can be a transfer from an account associated with the customer of the financial institution and held by the financial institution to an account of a person or entity different than the customer that is held by another financial institution.

In one embodiment, the UI includes a messaging screen that is displayed when the type of selected transfer is a transfer from an account associated with the customer of the financial institution and held by the financial institution to an account of a person or entity different than the customer. The messaging screen can be used to compose and transmit a message to the different person or entity. The message can include at least one field to indicate the amount of the transfer and a reason for the transfer. In one embodiment, the transfer between accounts is effected when the message is transmitted.

In one embodiment, the UI comprises an allocation screen. For each of one or more anticipated spending events, the allocation screen includes a first input field to receive first input indicating a description of the anticipated spending event, and a second input field to receive second input indicating an amount of the at least one second account to be allocated toward the anticipated spending event. The at least one first account and the at least one second account can be associated with a customer of the financial institution.

In one embodiment, the allocation screen includes, for each anticipated spending event, a third input field to receive third input indicating a date of the anticipated spending event, and a fourth input field to receive fourth input indicating a date prior to the date of the anticipated spending event on which a reminder of the anticipated spending event is to be provided to the customer.

In certain embodiments, the allocation screen can include text to indicate an amount of the at least one second account that is not allocated to the one or more anticipated spending events, and/or text to indicate an amount of interest earned on the at least one second account.

In one embodiment, the allocation screen is displayed only when the information graphic is in the second display state.

A method for displaying an information graphic via an electronic UI to integrate information from accounts held at a financial institution is also disclosed hereinabove. In one embodiment, the method includes displaying a first graphic element to display first information associated with at least one first account and displaying a second graphic element to display second information associated with at least one second account. A dimension of the first graphic element is representative of the first information and a dimension of the second graphic element is representative of the second information. Displaying the second graphical element includes displaying a first portion of the second graphic element that is selectable to alternately virtually hide and display a second portion of the second graphic element.

In another embodiment, the method includes displaying a first graphic element to display at least a portion of first information associated with at least one first account and displaying a second graphic element to display at least a portion of second information associated with at least one second account. Displaying the first and second graphic elements includes displaying a ratio of a dimension of the first graphic element to a dimension of the second graphic element that is substantially equal to a ratio of a balance contained in the at least one first account to a balance contained in the at least one second account. Displaying the second graphic element includes displaying a first portion of the second graphic element that is selectable to alternately virtually hide and display a second portion of the second graphic element.

A method for displaying a UI via an electronic device is also disclosed hereinabove. The method includes displaying an information graphic comprising first information associated with at least one first account and second information associated with at least one second account. The at least one first account and the at least one second account are held by a financial institution. Displaying the information graphic includes displaying a first graphic element and displaying a second graphic element adjacent the first graphic element. The second graphic element includes a selectable portion to alternately transition the information graphic between a first display state and a second display state. In one embodiment, the selectable portion of the second graphic element is responsive to clicking and/or dragging the selectable portion with a pointing device, such as a computer mouse. The method also includes displaying a first dimension of the first graphic element and a first dimension of the second graphic element when the information graphic is in the first display state. The first graphic element is to display the first information in the first display state, and the first dimension of the second graphic element is to display the selectable portion in the first display state. The method also includes increasing the first dimension of the second graphic element to a second dimension when the selectable portion of the second graphic element is selected during the first display state. The second dimension of the second graphic element corresponds to the second display state. The first graphic element is to display the first information in the second display state, and the second dimension of the second graphic element is to display the second information and the selectable portion in the second display state. The method also includes decreasing the second dimension of the second graphic element to the first dimension when the selectable portion of the second graphic element is selected during the second display state.

In one embodiment, displaying the first graphic element includes displaying a bounded shape or a line segment, and displaying the second graphic element includes displaying a bounded shape and a line segment. Displaying the first graphic element and displaying the second graphic element can include displaying substantially identical shapes. Displaying the first dimension of the first graphic element, and displaying the first and second dimensions of the second graphic element, can include displaying any of length, width and height.

In one embodiment, the method includes, when the selectable portion of the second graphic element is selected during the first display state, decreasing the first dimension of the first graphic element by an amount equal to the increase in the dimension of the second graphic element such that the combined dimensions of the first and second graphic elements does not change during a transition from the first display state to the second display state. In another embodiment, the method includes, when the selectable portion of the second graphic element is selected during the first display state, maintaining the first dimension of the first graphic element at a constant value such that the combined dimensions of the first and second graphic elements changes during a transition from the first display state to the second display state.

In one embodiment, the first information associated with the at least one first account includes a balance of the at least one first account, and the second information associated with the at least one second account includes a balance of the at least one second account. The at least one first account can include a demand account, and the at least one second account can include a savings account.

In one embodiment, the method includes, during the second display state, indicating, by relative dimensions of the first and second graphic elements, relative balances of the at least one first account and the at least one second account, respectively. This can include, for example, proportioning the relative dimensions of the first and second graphic elements based on the relative balances of the at least one first account and the at least one second account, respectively.

In one embodiment, the first graphic element includes text to indicate at least a portion of the first information, and the second dimension of the second graphic element includes text to indicate at least a portion of the second information.

In one embodiment, the method includes effecting a transfer between accounts via a transfer screen of the UI. Effecting the transfer includes receiving first input in a first input field of the transfer screen to indicate a type of the transfer, receiving second input in a second input field of the transfer screen to indicate a source of the transfer, receiving a third input in a third input field of the transfer screen to indicate a destination of the transfer and receiving a fourth input in a fourth input field of the transfer screen to indicate an amount of the transfer. The method can also include determining eligible values of at least one of the second and third inputs based on a value of the first input, and/or determining eligible values of the third input based on a value of at least one of the first and second inputs. In one embodiment, effecting the transfer includes (1) effecting a transfer between accounts associated with a customer of the financial institution, wherein at least one of the accounts associated with the customer held by the financial institution, or (2) effecting a transfer between an account associated with the customer of the financial institution and held by the financial institution and an account of a person or entity different than the customer. Effecting a transfer in instance (1) can include effecting a transfer from an account held by the financial institution and associated with the customer to an account held by another financial institution that is associated with the customer. Effecting a transfer in instance (2) can include effecting a transfer from an account associated with the customer of the financial institution and held by the financial institution to an account of a person or entity different than the customer that is held by another financial institution.

In one embodiment, the method includes displaying a messaging screen when the transfer is a transfer from an account associated with the customer of the financial institution and held by the financial institution to an account of a person or entity different than the customer. The messaging screen can be used to compose and transmit a message to the different person or entity. In one embodiment, the method includes effecting the transfer between accounts when the message is transmitted.

In one embodiment, the method includes displaying an allocation screen. Displaying the allocation screen includes, for each of one or more anticipated spending events, displaying a first input field to receive first input indicating a description of the anticipated spending event, and displaying a second input field to receive second input indicating an amount of the at least one second account to be allocated toward the anticipated spending event. The least one first account, the at least one second account, and the one or more anticipated spending events can be associated with a customer of the financial institution.

In one embodiment, displaying the allocation screen includes, for each of the one or more anticipated spending events, displaying a third input field to receive third input indicating a date of the anticipated spending event and di playing a fourth input field to receive fourth input indicating a date prior to the date of the anticipated spending event on which a reminder of the anticipated spending event is to be provided to the customer.

In certain embodiments, displaying the allocation screen includes (1) displaying text to indicate an amount of the at least one second account that is not allocated to the one or more anticipated spending events, and/or (2) displaying text to indicate an amount of interest earned on the at least one second account. Displaying the allocation screen can also include displaying the allocation screen only when the information graphic is in the second display state.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function, including, for example, a combination of elements that performs that function. Furthermore, the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that some of the embodiments as described hereinabove may be implemented in many different embodiments of software, firmware, and/or hardware. The software code or specialized control hardware used to implement some of the present embodiments is not limiting of the present invention. For example, the embodiments described hereinabove may be implemented in computer software using any suitable computer software language. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software that may cause programmable equipment to execute the processes may be stored in any storage device, such as, for example, a computer system (nonvolatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. A computer-readable medium may further involve one or more data signals transmitted on one or more propagated computer-readable mediums.

Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers.

Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent, however, that various modifications, alterations and adaptations to those embodiments may occur to persons skilled in the art with the attainment of some or all of the advantages of the present invention. For example, features described in connection with the slide controller 55 can generally be adapted for use with the information graphic 115, and vice versa. The disclosed embodiments are therefore intended to include all such modifications, alterations and adaptations without departing from the scope and spirit of the present invention as set forth in the appended claims.

What is claimed is:

1. An electronic device for displaying a user interface (UI), the electronic device comprising:
 a processor programmed to execute an information graphic that displays first information associated with at least one first account and second information associated with at least one second account, the at least one first account and the at least one second account held by a financial institution, the information graphic comprising:
  a first graphic element;
  a second graphic element adjacent the first graphic element, the second graphic element comprising a selectable portion to alternately transition the information graphic between a first display state and a second display state;
 wherein:
  a first dimension of the first graphic element and a first dimension of the second graphic element are displayed when the information graphic is in the first display state, the first graphic element to display the first information in the first display state, and the first dimension of the second graphic element to display the selectable portion in the first display state;
  the first dimension of the second graphic element is increased to a second dimension when the selectable portion of the second graphic element is selected during the first display state, the second dimension of the second graphic element corresponding to the second display state, the first graphic element to display the first information in the second display state, and the second dimension of the second graphic element to display the second information and the selectable portion in the second display state; and
  the second dimension of the second graphic element is decreased to the first dimension when the selectable portion of the second graphic element is selected during the second display state;
 a slide controller within the information graphic and a bar element positioned behind the information graphic, wherein when in the second display state:
  actuation of a slide controller redistributes funds between the at least one first account and the at least one second account; and
  the information graphic is transparent such that the information graphic is partially visible therethrough, wherein a proportional length between the first graphic element and the information graphic is indicative of a combined amount in both the at least one first account and the at least one second account to be consumed by bill payments, wherein a length of the information graphic exceeds a length of the bar element when a combined amount in both the at least one first account and the at least one second account is greater than the combined amount in both the at least one first account and the at least one second account to be consumed by bill payments, and the length of the bar element exceeds the length of the information graphic when the combined amount in both the at least one first account and the at least one second account to be consumed by bill payments is greater than the combined amount in both the at least one first account and the at least one second account.

2. The electronic device of claim 1, wherein:
a shape of the first graphic element comprises a shape selected from the group consisting of: a bounded shape and a line segment; and
a shape of the second graphic element comprises a shape selected from the group consisting of: a bounded shape and a line segment.

3. The electronic device of claim 2, wherein:
the first graphic element and the second graphic element comprise identical shapes.

4. The electronic device of claim 1, wherein:
the first dimension of the first graphic element is selected from the group consisting of: length, width, height.

5. The electronic device of claim 1, wherein:
the first and second dimensions of the second graphic element are selected from the group consisting of: length, width, height.

6. The electronic device of claim 1, wherein:
when the selectable portion of the second graphic element is selected during the first display state, the first dimension of the first graphic element is decreased by an amount equal to the increase in the dimension of the second graphic element such that the combined dimensions of the first and second graphic elements does not change during a transition from the first display state to the second display state.

7. The electronic device of claim 1, wherein:
when the selectable portion of the second graphic element is selected during the first display state, the first dimension of the first graphic element remains constant such that the combined dimensions of the first and second graphic elements changes during a transition from the first display state to the second display state.

8. The electronic device of claim 1, wherein:
the first information associated with the at least one first account comprises a balance of the at least one first account; and
the second information associated with the at least one second account comprises a balance of the at least one second account.

9. The electronic device of claim 1, wherein:
during the second display state, relative dimensions of the first and second graphic elements are indicative of relative balances of the at least one first account and the at least one second account, respectively.

10. The electronic device of claim 9, wherein:
during the second display state, the relative dimensions of the first and second graphic elements are in proportion to relative balances of the at least one first account and the at least one second account, respectively.

11. The electronic device of claim 1, wherein:
the at least one first account comprises a demand account; and
the at least one second account comprises a savings account.

12. The electronic device of claim 1, wherein:
the selectable portion of the second graphic element is responsive to at least one of: clicking the selectable portion with a pointing device and dragging the selectable portion with the pointing device.

13. The electronic device of claim 1, wherein:
the first graphic element comprises text to indicate at least a portion of the first information; and
the second dimension of the second graphic element comprises text to indicate at least a portion of the second information.

14. The electronic device of claim 1, comprising:
a transfer screen to effect a transfer between accounts, the transfer screen comprising: a first input field to receive first input indicating a type of the transfer; a second input field to receive second input indicating a source of the transfer; a third input field to receive third input indicating a destination of the transfer; and a fourth input field to receive fourth input indicating an amount of the transfer.

15. The electronic device of claim 14, wherein:
eligible values of at least one of the second and third inputs are determined based on a value of the first input.

16. The electronic device of claim 14, wherein:
eligible values of the third input are determined based on a value of at least one of the first and second inputs.

17. The electronic device of claim 14, wherein:
the type of transfer is selected from the group consisting of: a transfer between accounts associated with a customer of the financial institution, at least one of the accounts associated with the customer held by the financial institution; and a transfer between an account associated with the customer of the financial institution and held by the financial institution and an account of a person or entity different than the customer.

18. The electronic device of claim 17, wherein:
the type of selected transfer is a transfer from an account held by the financial institution and associated with the customer to an account held by another financial institution that is associated with the customer.

19. The electronic device of claim 17, wherein:
the type of selected transfer is a transfer from an account associated with the customer of the financial institution and held by the financial institution to an account of a person or entity different than the customer that is held by another financial institution.

20. The electronic device of claim 17, comprising:
a messaging screen displayed when selected transfer is a transfer from an account associated with the customer of the financial institution and held by the financial institution to an account of a person or entity different than the customer, the messaging screen for composing and transmitting a message to the different person or entity.

21. The electronic device of claim 20, wherein:
the messaging screen is for composing a message comprising at least one field to indicate the amount of the transfer and a reason for the transfer.

22. The electronic device of claim 20, wherein:
the transfer between accounts is effected when the message is transmitted.

23. The electronic device of claim 1, comprising:
an allocation screen comprising, for each of one or more anticipated spending events: a first input field to receive first input indicating a description of the anticipated spending event; and a second input field to receive second input indicating an amount of the at least one second account to be allocated toward the anticipated spending event;
wherein the at least one first account, the at least one second account, and the one or more anticipated spending events are associated with a customer of the financial institution.

24. The electronic device of claim 23, wherein the allocation screen comprises, for each of the one or more anticipated spending events:
a third input field to receive third input indicating a date of the anticipated spending event; and
a fourth input field to receive fourth input indicating a date prior to the date of the anticipated spending event on which a reminder of the anticipated spending event is to be provided to the customer.

25. The electronic device of claim 23, wherein the allocation screen comprises text to indicate an amount of the at least one second account that is not allocated to the one or more anticipated spending events.

26. The electronic device of claim 23, wherein the allocation screen comprises text to indicate an amount of interest earned on the at least one second account.

27. The electronic device of claim 23, wherein the allocation screen is displayed only when the information graphic is in the second display state.

28. An electronic device for displaying an information graphic displayable via an electronic user interface to integrate information from accounts held at a financial institution, the electronic device comprising:
a processor programmed to execute an information graphic comprising a first graphic element and a second graphic element, wherein:
the first graphic element is configured to display at least a portion of first information associated with at least one first account; and
the second graphic element is configured to display at least a portion of second information associated with at least one second account;
a ratio of a dimension of the first graphic element to a dimension of the second graphic element is equal to a ratio of a balance contained in the at least one first account to a balance contained in the at least one second account; and
the second graphic element comprises a first portion selectable to alternately virtually hide and display a second portion of the second graphic element;
the processor is programmed to generate a slide controller within the information graphic and a bar element positioned behind the information graphic, wherein when a second portion of the second graphic element is not hidden:
actuation of a slide controller redistributes funds between the at least one first account and the at least one second account; and
the information graphic is transparent such that the information graphic is partially visible therethrough, wherein a proportional length between the first graphic element and the information graphic is indicative of a combined amount in both the at least one first account and the at least one second account to be consumed by bill payments, wherein a length of the information graphic exceeds a length of the bar element when a combined amount in both the at least one first account and the at least one second account is greater than the combined amount in both the at least one first account and the at least one second account to be consumed by bill payments, and the length of the bar element exceeds the length of the information graphic when the combined amount in both the at least one first account and the at least one second account to be consumed by bill payments is greater than the combined amount in both the at least one first account and the at least one second account.

29. The electronic device of claim 28, wherein:
the first graphic element is adjacent the second graphic element.

30. The electronic device of claim 28, wherein:
a shape of the first graphic element comprises a shape selected from the group consisting of: a bounded shape and a line segment; and
a shape of the second graphic element comprises a shape selected from the group consisting of: a bounded shape and a line segment.

31. The electronic device of claim 30, wherein:
the first graphic element and the second graphic element comprise identical shapes.

32. The electronic device of claim 28, wherein:
the ratio of dimensions is selected from the group consisting of: a ratio of lengths, a ratio of widths and a ratio of heights.

33. The electronic device of claim 28, wherein:
the at least one first account and the at least one second account are held at the financial institution by a customer of the financial institution.

34. The electronic device of claim 28, wherein:
when the first portion of the second graphic element is selected during display of the second portion of the second graphic element, the dimension of the first graphic element is increased to virtually hide the second portion of the second graphic element.

35. The electronic device of claim 28, wherein:
when the first portion of the second graphic element is selected during display of the second portion of the second graphic element, the dimension of the second portion of the second graphic element is reduced to virtually hide the second portion of the second graphic element.

36. The electronic device of claim 28, wherein:
the first portion of the second graphic element is selectable with a pointing device by at least one of clicking and dragging the first portion of the second graphic element.

37. The electronic device of claim 28, wherein:
the first information associated with the at least one first account comprises a balance of the at least one first account; and
the second information associated with the at least one second account comprises a balance of the at least one second account.

38. The electronic device of claim 28, wherein:
the at least one first account comprises a demand account; and
the at least one second account comprises a savings account.

39. The electronic device of claim 28, wherein:
the first graphic element comprises text to indicate at least a portion of the first information; and
the second graphic element comprises text to indicate at least a portion of the second information.

40. An electronic device for displaying an information graphic displayable via an electronic user interface to integrate information from accounts held at a financial institution, the electronic device comprising:
a processor programmed to execute an information graphic comprising a first graphic element and a second graphic element, wherein:
the first graphic element is configured to display first information associated with at least one first account; and
the second graphic element is configured to display second information associated with at least one second account;
a dimension of the first graphic element is representative of the first information;
a dimension of the second graphic element is representative of the second information; and
a first portion of the second graphic element is selectable to alternately virtually hide and display a second portion of the second graphic element;
the processor is programmed to generate a slide controller within the information graphic and a bar element positioned behind the information graphic, wherein when a second portion of the second graphic element is not hidden:

actuation of a slide controller redistributes funds between the at least one first account and the at least one second account; and the information graphic is transparent such that the information graphic is partially visible therethrough, wherein a proportional length between the first graphic element and the information graphic is indicative of a combined amount in both the at least one first account and the at least one second account to be consumed by bill payments, wherein a length of the information graphic exceeds a length of the bar element when a combined amount in both the at least one first account and the at least one second account is greater than the combined amount in both the at least one first account and the at least one second account to be consumed by bill payments, and the length of the bar element exceeds the length of the information graphic when the combined amount in both the at least one first account and the at least one second account to be consumed by bill payments is greater than the combined amount in both the at least one first account and the at least one second account.

* * * * *